United States Patent
Embleton et al.

(10) Patent No.: US 11,853,024 B2
(45) Date of Patent: Dec. 26, 2023

(54) SYSTEM AND METHOD FOR SERVICE LIFE MANAGEMENT BASED ON CORROSION RATE MEASUREMENT

(71) Applicant: Dell Products L.P., Hopkinton, MA (US)

(72) Inventors: Steven Embleton, Austin, TX (US); Jon Taylor Fitch, Austin, TX (US); Sandor T. Farkas, Round Rock, TX (US); Joseph Danny King, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 818 days.

(21) Appl. No.: 16/938,699

(22) Filed: Jul. 24, 2020

(65) Prior Publication Data
US 2022/0026870 A1    Jan. 27, 2022

(51) Int. Cl.
G05B 19/042   (2006.01)
G01N 17/04    (2006.01)
G01N 17/00    (2006.01)
G06F 11/30    (2006.01)
G06F 1/20     (2006.01)

(52) U.S. Cl.
CPC ......... *G05B 19/0428* (2013.01); *G01N 17/00* (2013.01); *G01N 17/04* (2013.01); *G06F 1/206* (2013.01); *G06F 11/3058* (2013.01); G05B 2219/24015 (2013.01)

(58) Field of Classification Search
CPC .... G01N 17/00; G01N 17/04; G05B 19/0428; G05B 2219/24015; G06F 1/206; G06F 11/004; G06F 11/3044; G06F 11/3058

USPC .......................................................... 702/34
See application file for complete search history.

(56) References Cited

U.S. PATENT DOCUMENTS

| | | | |
|---|---|---|---|
| 8,949,040 B2 * | 2/2015 | Chey .................. | H05K 7/20745 |
| | | | 702/34 |
| 2009/0273857 A1 | 11/2009 | Iben et al. | |
| 2013/0265064 A1 | 10/2013 | Hamann et al. | |
| 2014/0078668 A1 | 3/2014 | Goulden et al. | |
| 2017/0089607 A1 | 3/2017 | Vichare et al. | |
| 2019/0310696 A1 | 10/2019 | Campbell et al. | |
| 2019/0371367 A1 | 12/2019 | Asmussen et al. | |

OTHER PUBLICATIONS

"OnGuard Smart"; Purafil, Inc.; 2017 (https://www.purafil.com/products/monitoring/active-monitoring/onguard-smart/).

* cited by examiner

*Primary Examiner* — John H Le
(74) *Attorney, Agent, or Firm* — Chamberlain, Hrdlicka, White, Williams & Aughtry

(57) ABSTRACT

A computing device of an information handling system includes an environmental control component and an environmental manager. The environmental control components identifies an aggregate amount of corrosion of a component of the information handling system; obtains a rate of corrosion associated with the component; makes a determination that the rate of corrosion indicates that the component will suffer a premature failure; in response to the determination: identifies an environmental control modification that will remediate the premature failure of the component; and updates an operation of the environmental control component based on the environmental control modification.

20 Claims, 15 Drawing Sheets

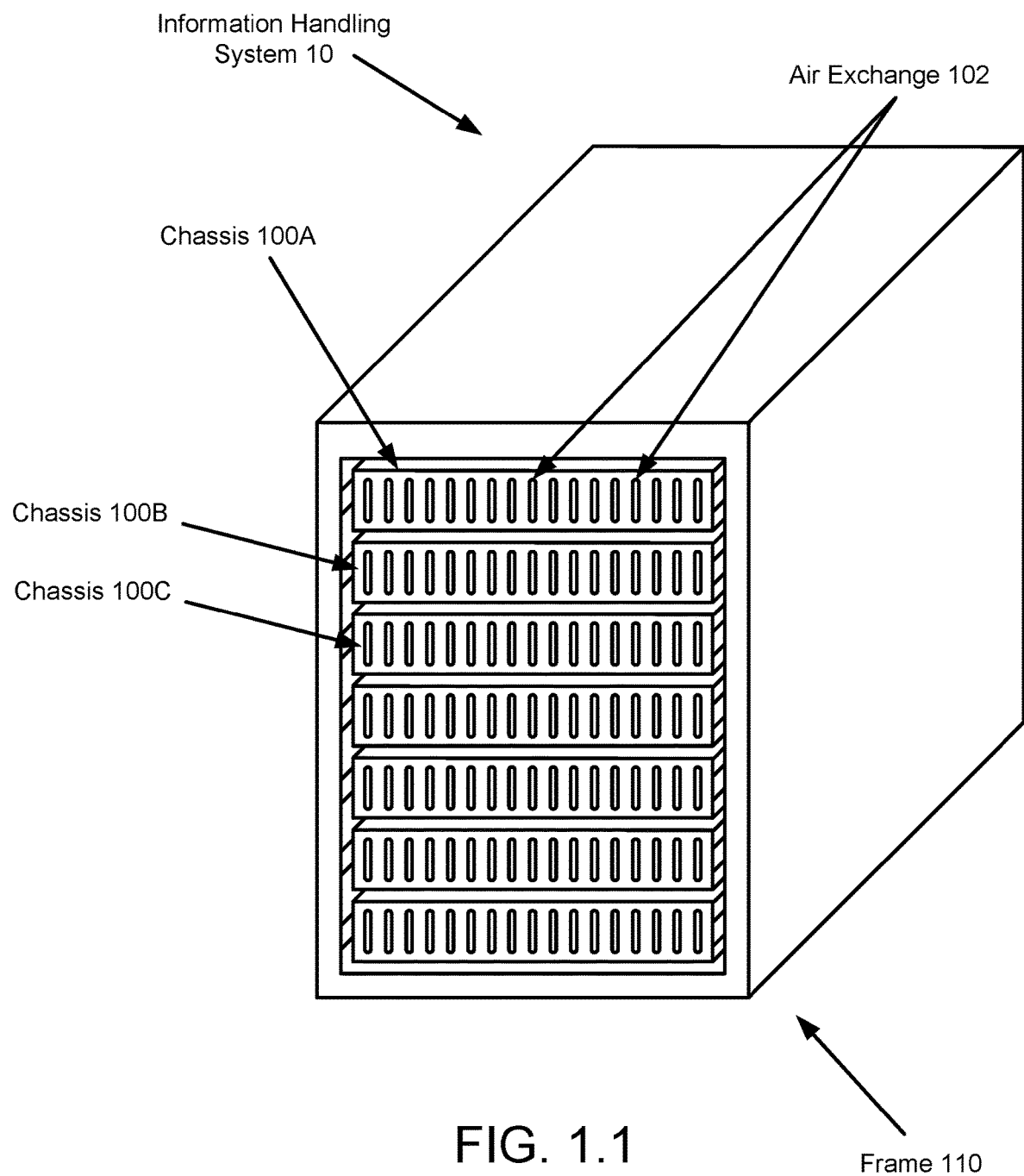
FIG. 1.1

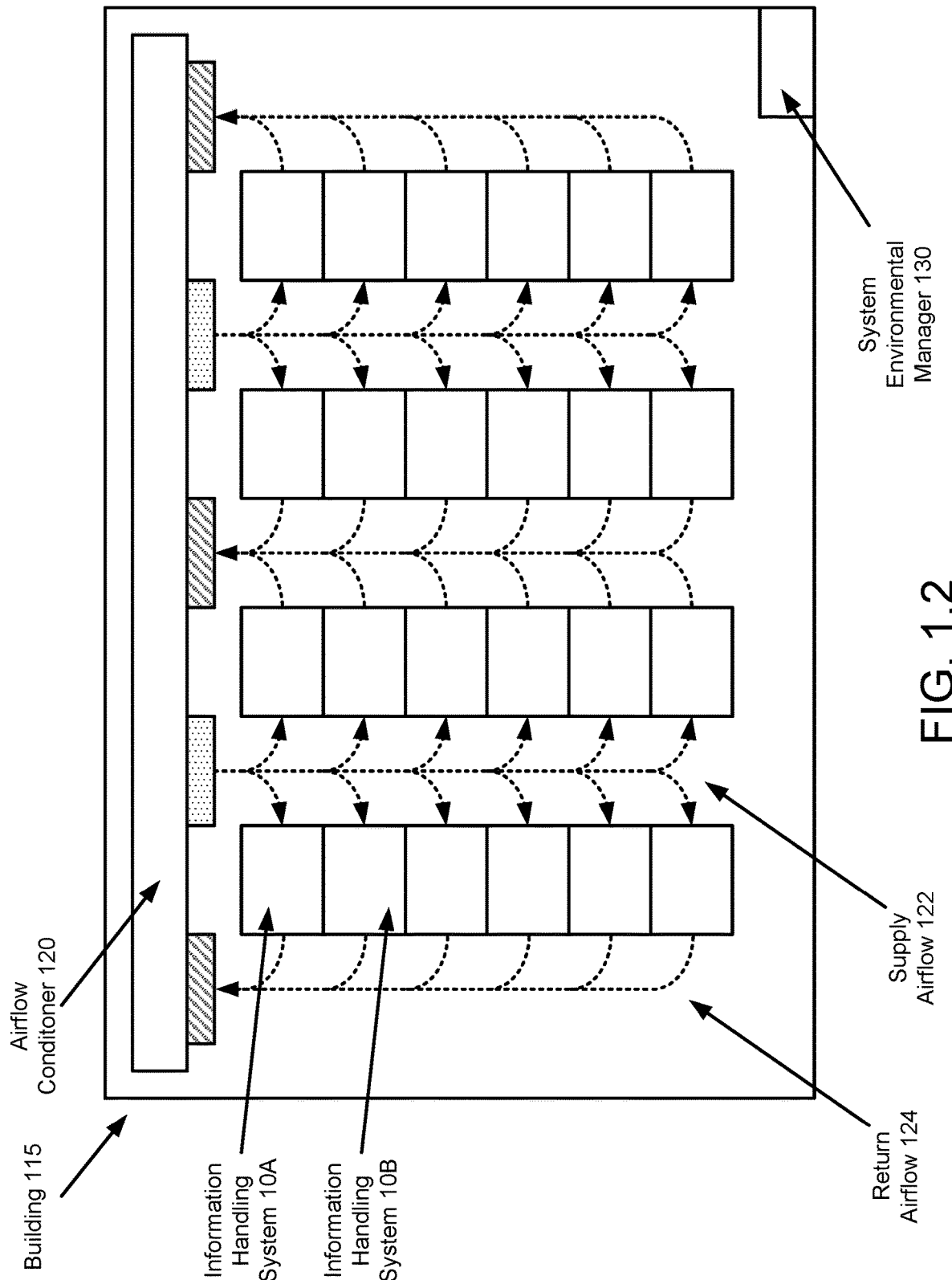
FIG. 1.2

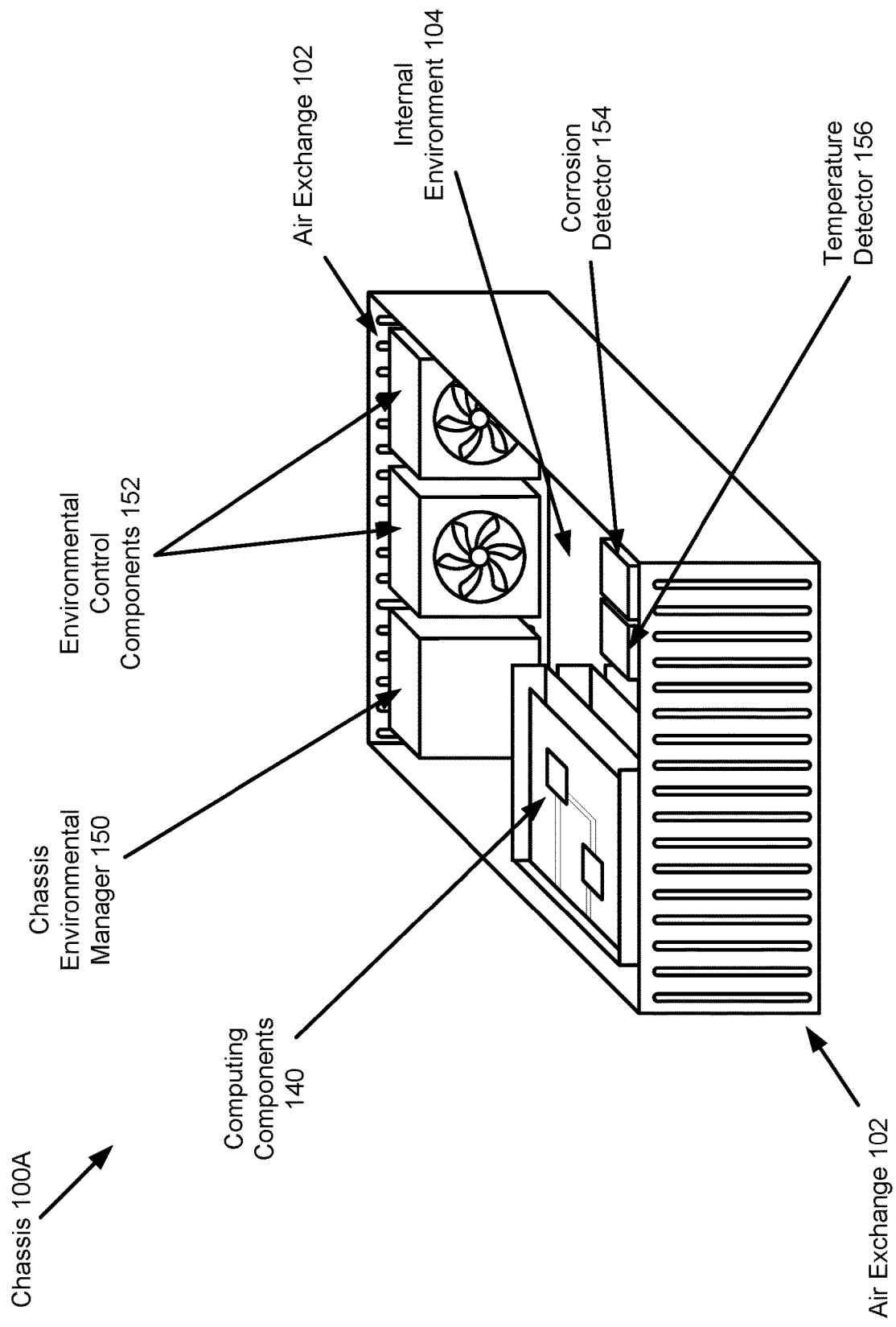
FIG. 1.3

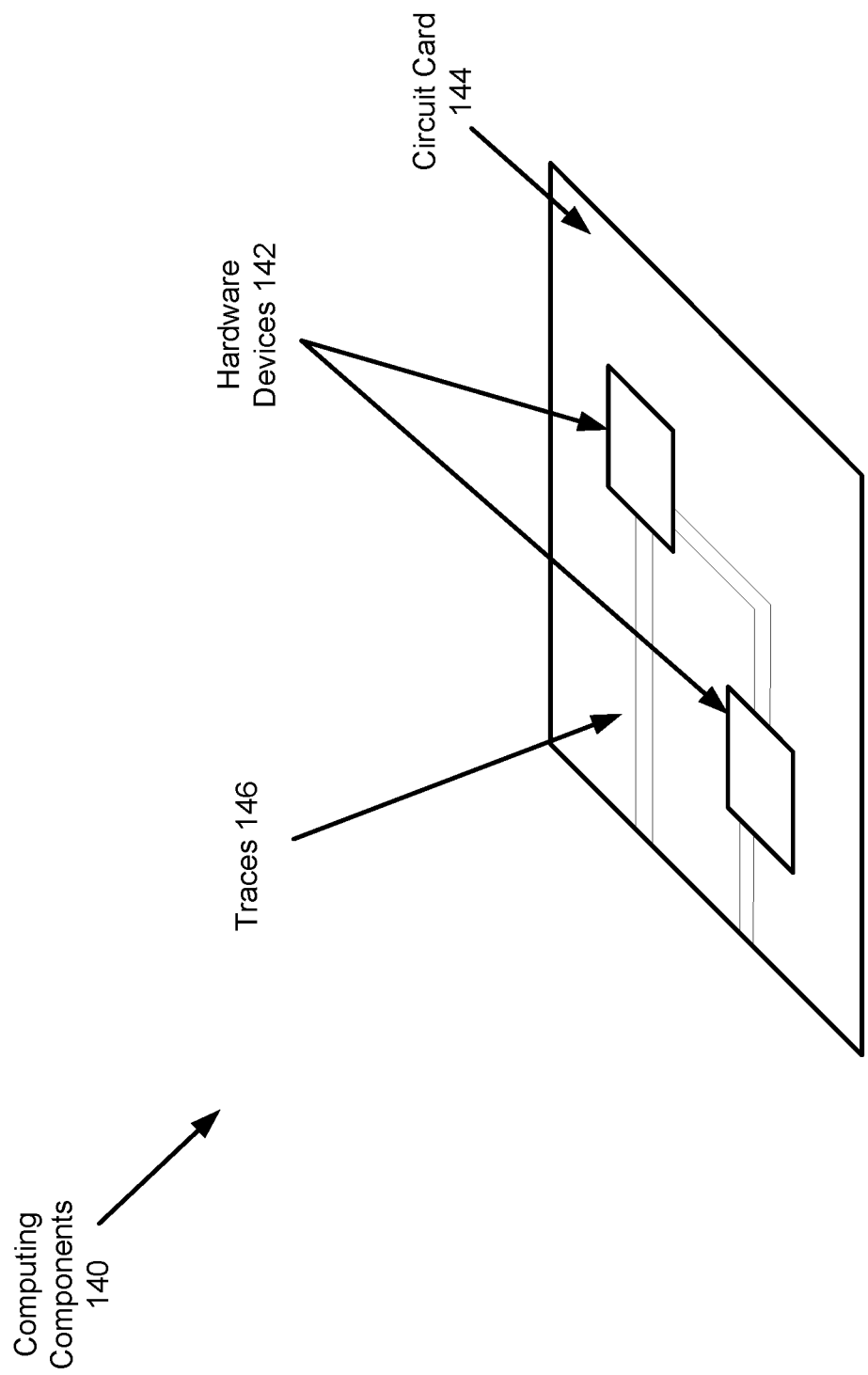
FIG. 1.4

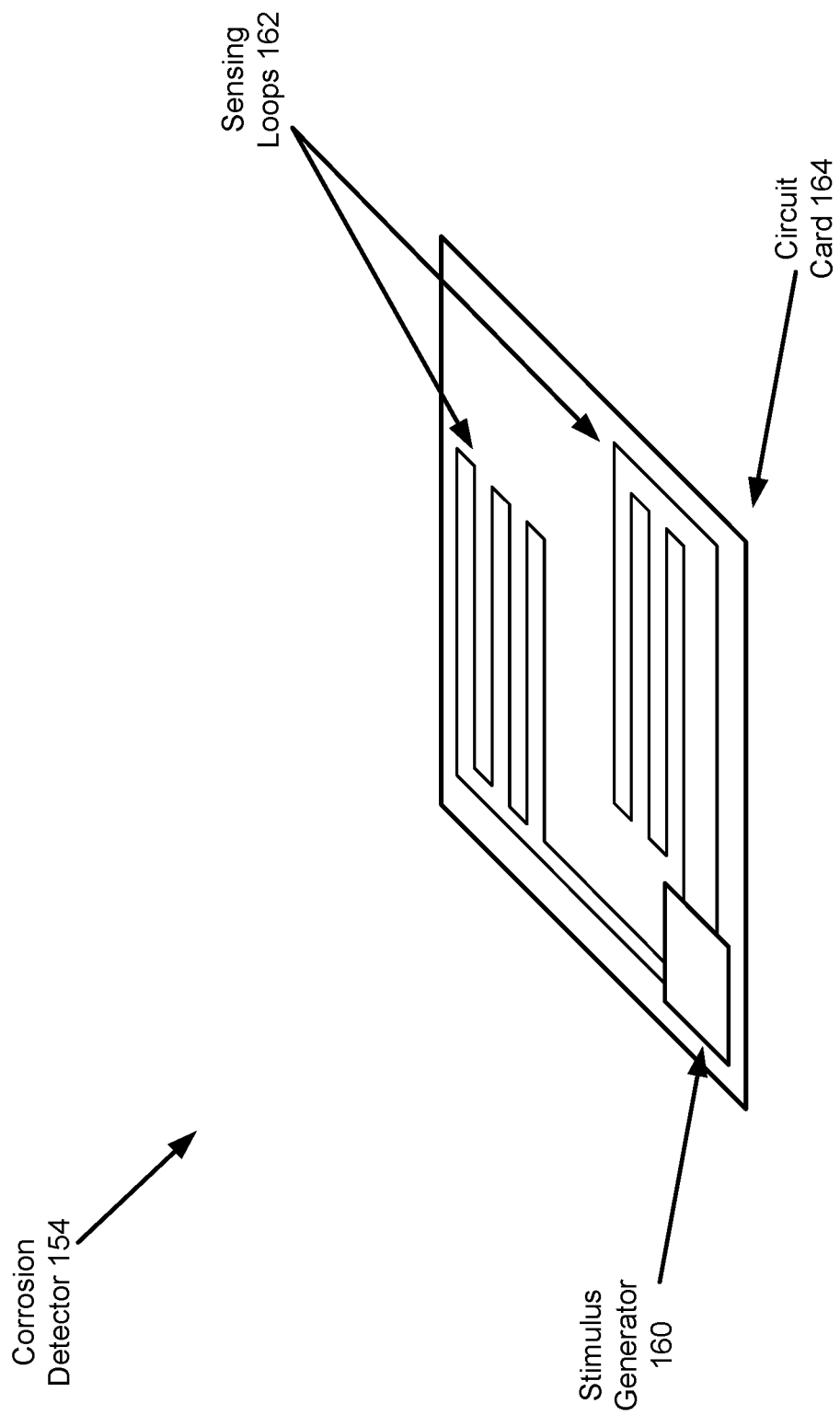
FIG. 1.5

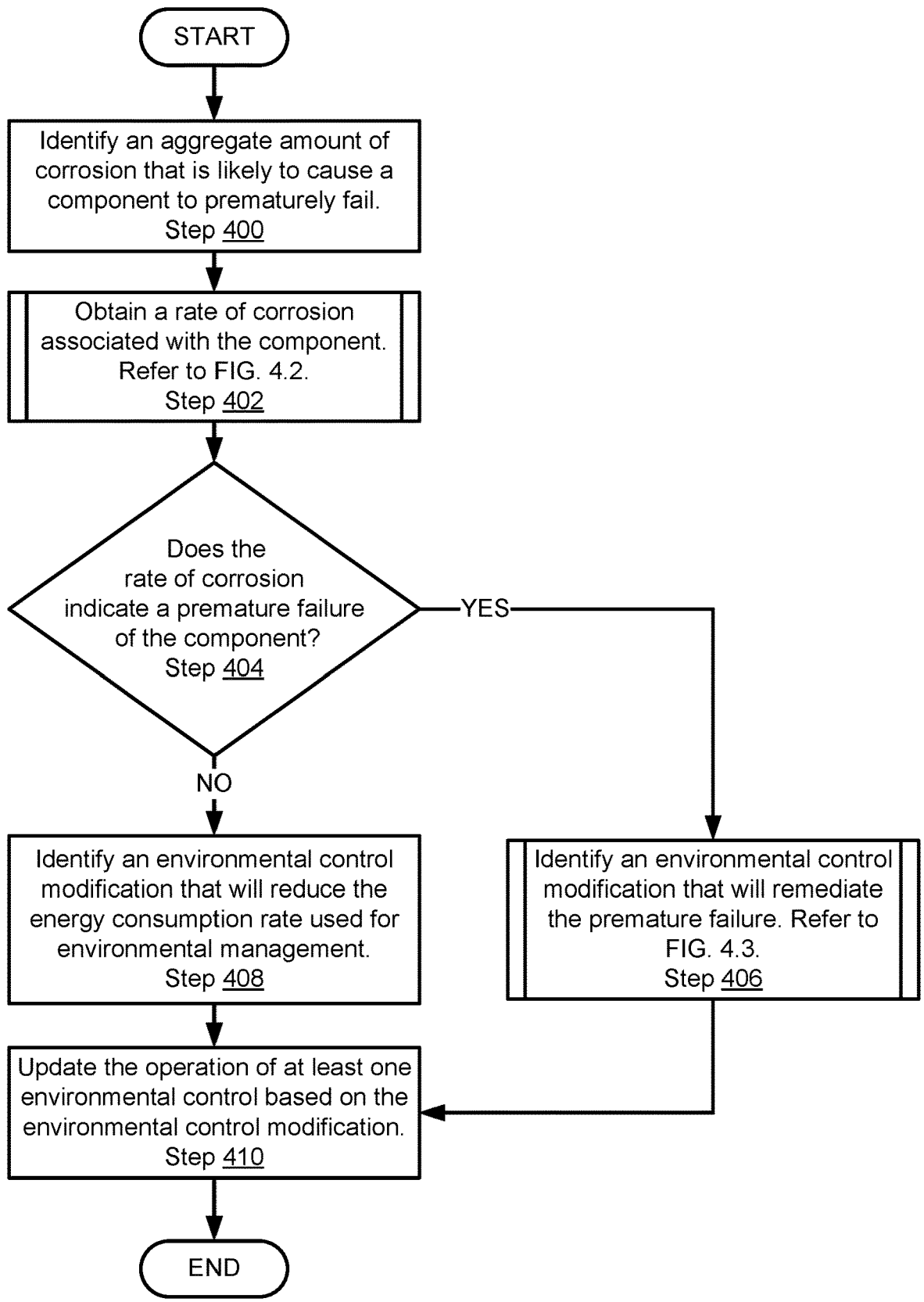
FIG. 4.1

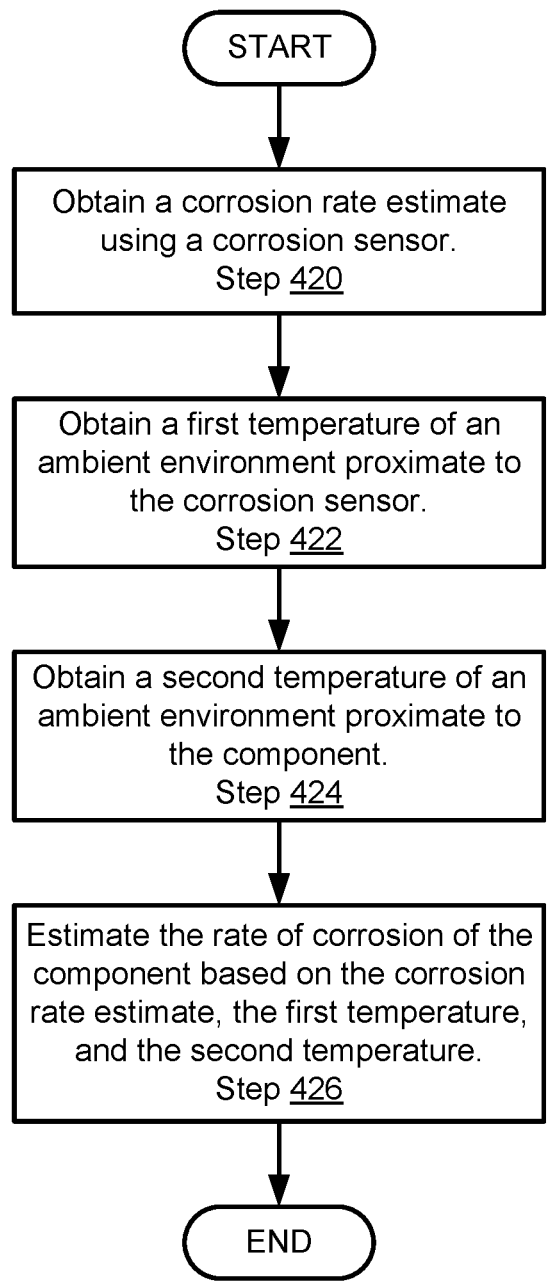
FIG. 4.2

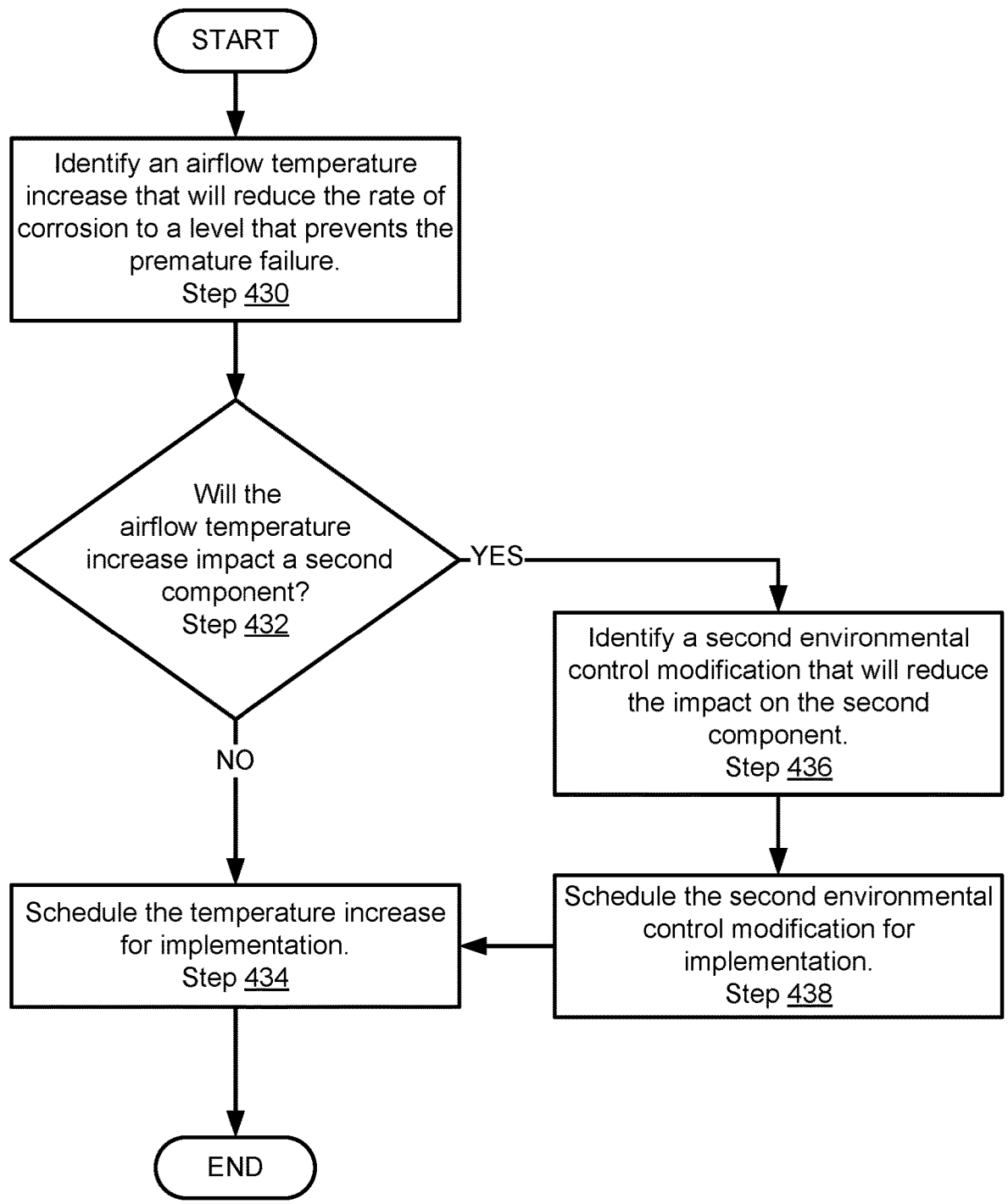
FIG. 4.3

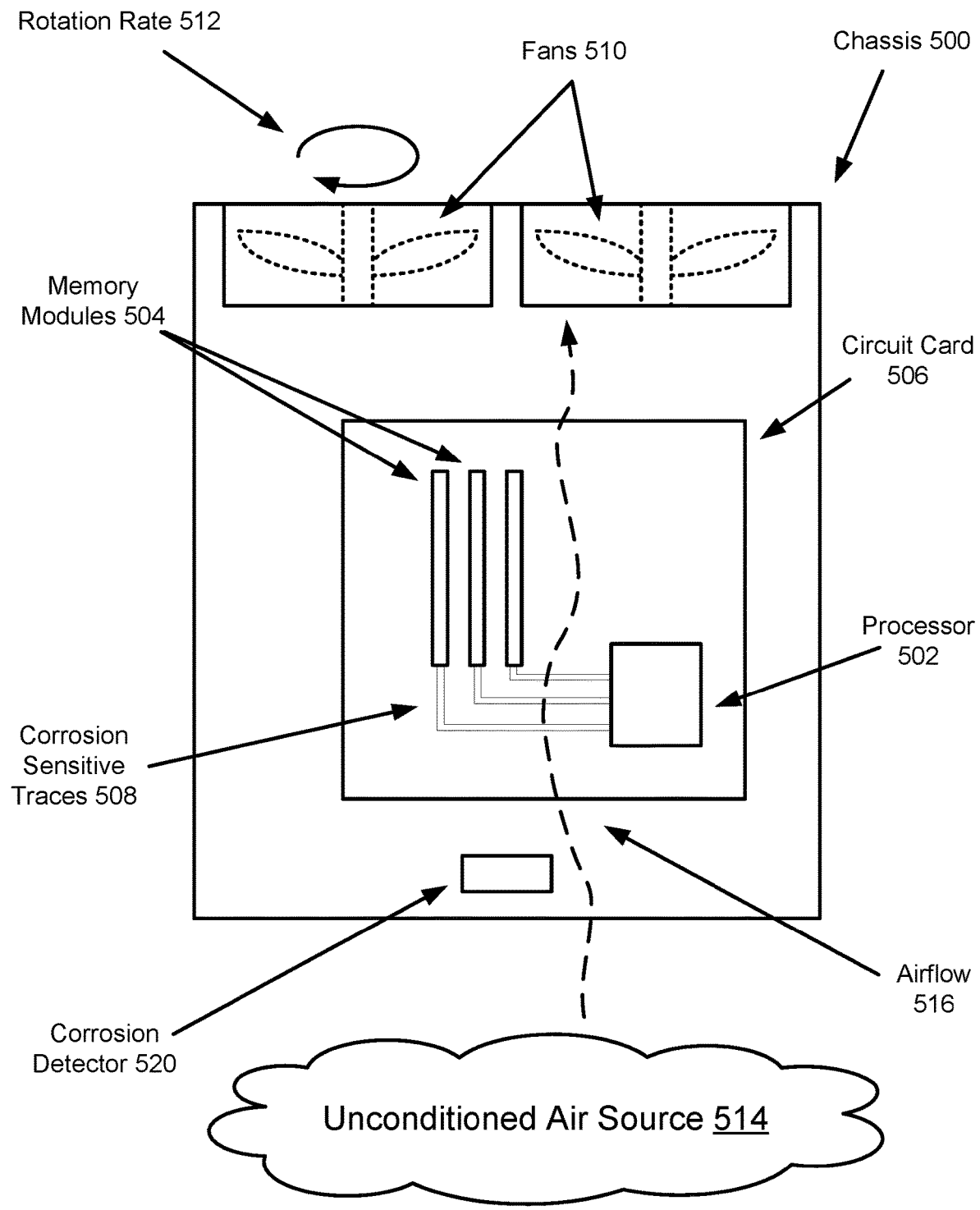
FIG. 5.1

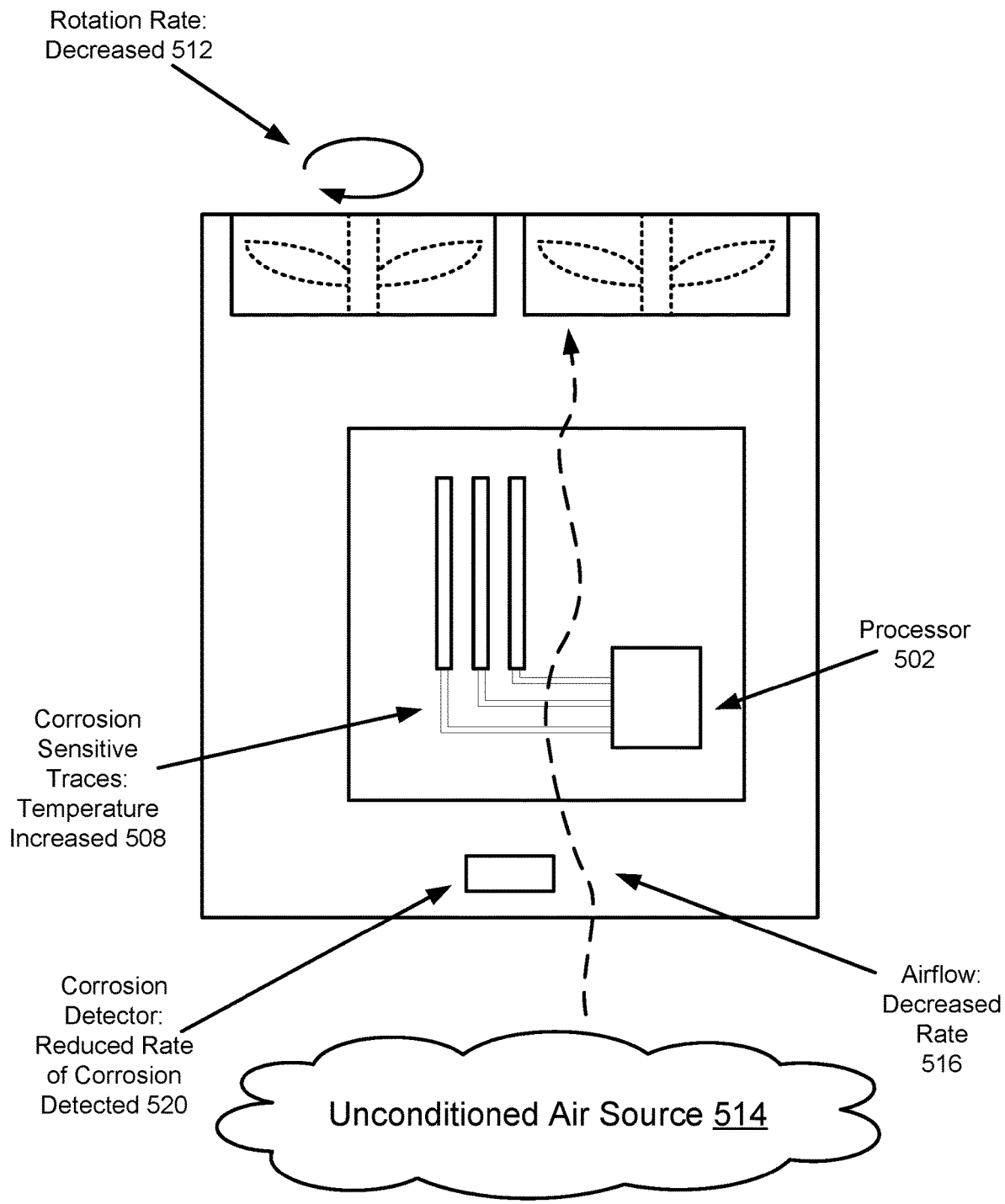
FIG. 5.2

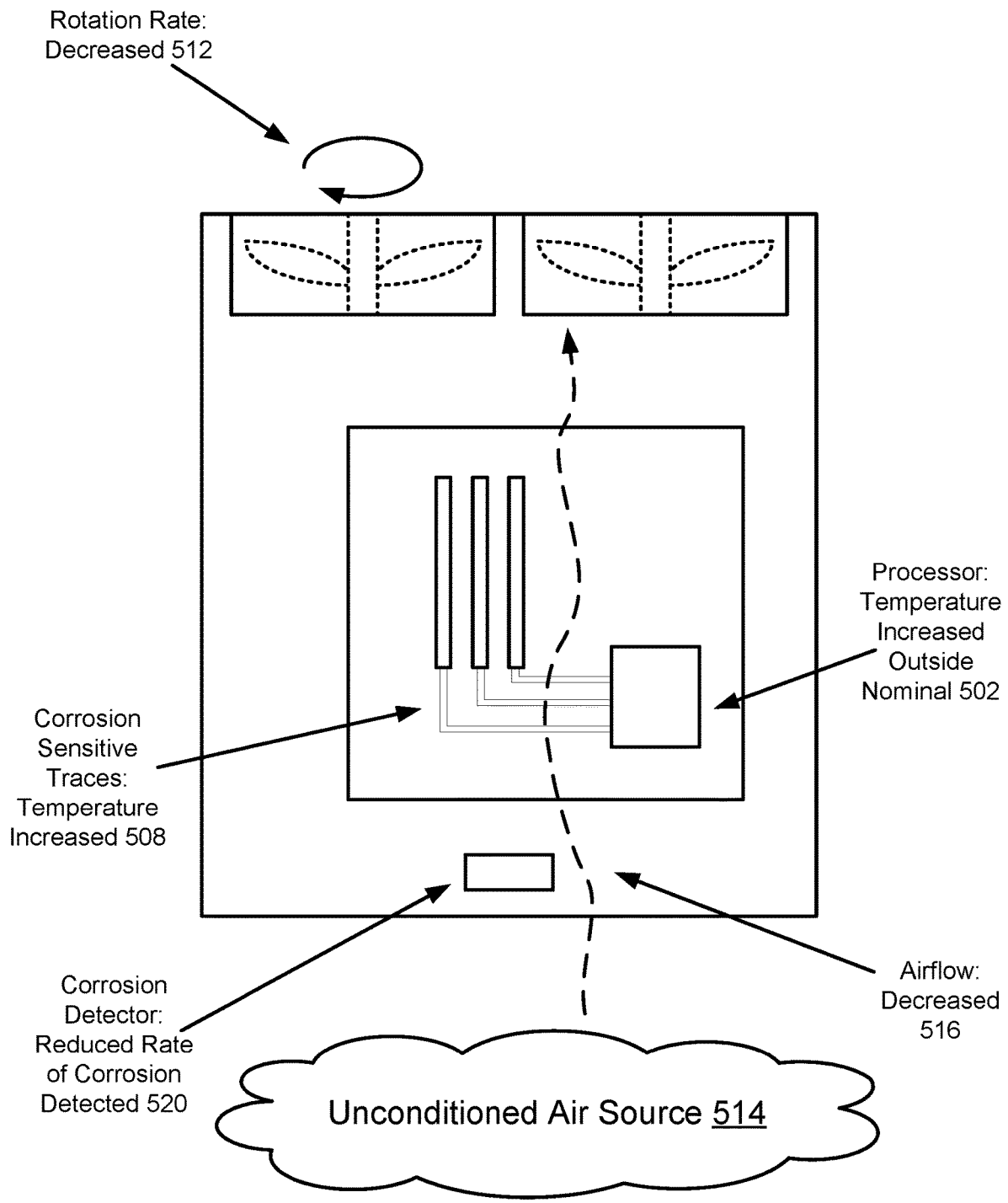
FIG. 5.3

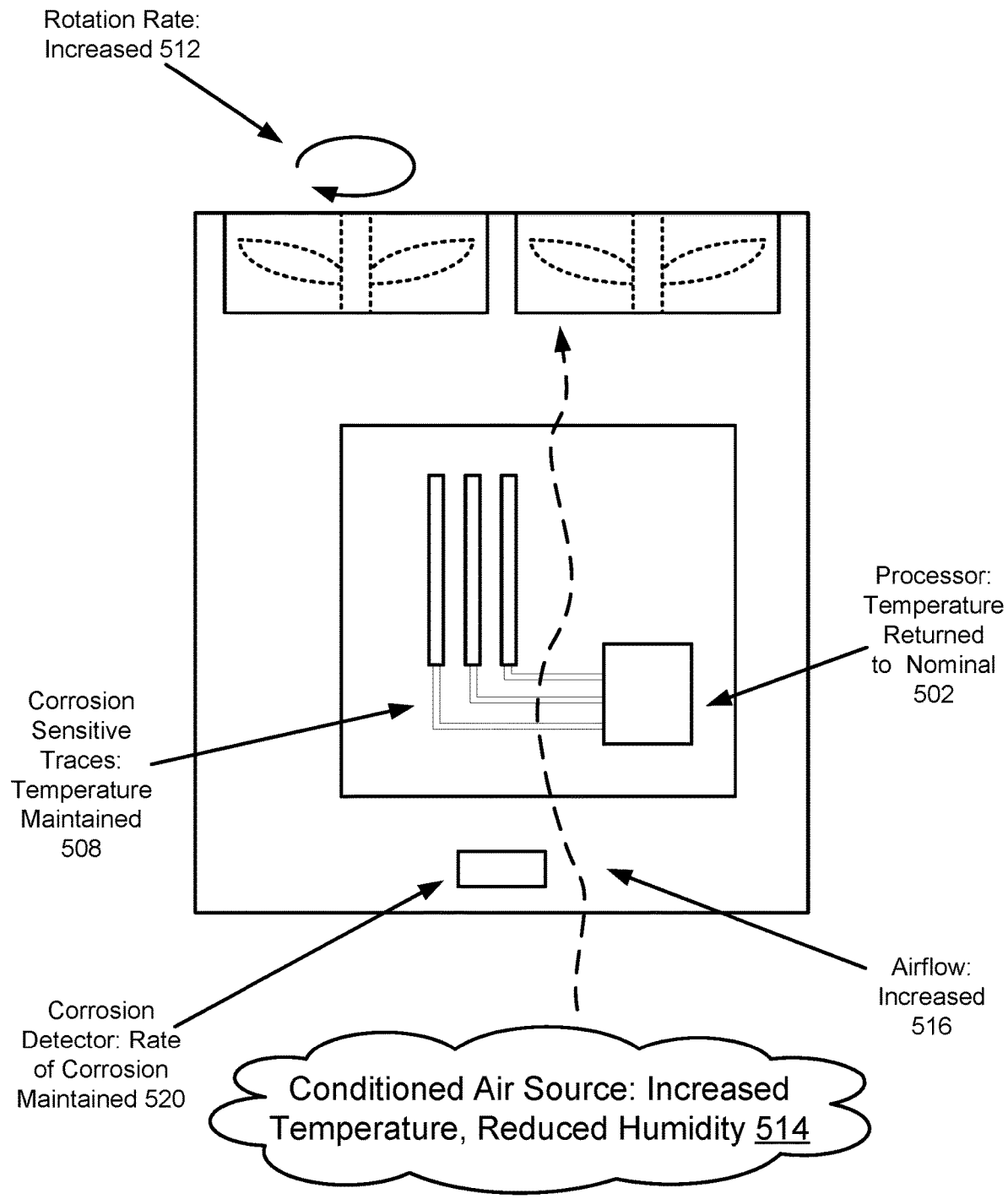
FIG. 5.4

SYSTEM AND METHOD FOR SERVICE LIFE MANAGEMENT BASED ON CORROSION RATE MEASUREMENT

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use cases for information handling systems are causing progressively larger number of information handling systems to be disposed near each other. For example, rack mount systems utilize a rack structure to stack many information handling systems in a vertical arrangement. Due to the changing uses of information handling systems, chassis of information handling systems may modular. That is, a chassis may be composed of multiple enclosures that may be attached to each other to form the chassis of the information handling systems. When the multiple enclosures are attached, components of the information handling system disposed in each of the enclosures may become operably connected to each other.

SUMMARY

In one aspect, a computing device of an information handling system in accordance with one or more embodiments of the invention includes an environmental control component and an environmental manager. The environmental control components identifies an aggregate amount of corrosion of a component of the information handling system; obtains a rate of corrosion associated with the component; makes a determination that the rate of corrosion indicates that the component will suffer a premature failure; in response to the determination: identifies an environmental control modification that will remediate the premature failure of the component; and updates an operation of the environmental control component based on the environmental control modification.

In one aspect, a method for environmentally managing a computing device of an information handling system in accordance with one or more embodiments of the invention includes identifying an aggregate amount of corrosion of a component of the information handling system; obtaining a rate of corrosion associated with the component; making a determination that the rate of corrosion indicates that the component will suffer a premature failure; in response to the determination: identifying an environmental control modification that will remediate the premature failure of the component; and updating an operation of a environmental control component of the computing device based on the environmental control modification.

In one aspect, a non-transitory computer readable medium includes computer readable program code, which when executed by a computer processor enables the computer processor to perform a method for environmentally managing a computing device of an information handling system, the method in accordance with one or more embodiments of the invention includes identifying an aggregate amount of corrosion of a component of the information handling system; obtaining a rate of corrosion associated with the component; making a determination that the rate of corrosion indicates that the component will suffer a premature failure; in response to the determination: identifying an environmental control modification that will remediate the premature failure of the component; and updating an operation of a environmental control component of the computing device based on the environmental control modification.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of an information handling system in accordance with one or more embodiments of the invention.

FIG. 1.2 shows a diagram of a building that includes information handling systems in accordance with one or more embodiments of the invention.

FIG. 1.3 shows a diagram of a chassis of an information handling systems in accordance with one or more embodiments of the invention.

FIG. 1.4 shows a diagram of computing components in accordance with one or more embodiments of the invention.

FIG. 1.5 shows a diagram of a corrosion detector in accordance with one or more embodiments of the invention.

FIG. 4.1 shows a flowchart of a method of managing an internal environment of a chassis of an information handling system in accordance with one or more embodiments of the invention.

FIG. 4.2 shows a flowchart of a method of obtaining a rate of corrosion associated with a component in accordance with one or more embodiments of the invention.

FIG. 4.3 shows a flowchart of a method of identifying an environmental control modification to remediate a premature failure in accordance with one or more embodiments of the invention.

FIGS. 5.1-5.4 show a top view diagram of an example ejector chassis of an information handling system over time.

DETAILED DESCRIPTION

Figure 2:
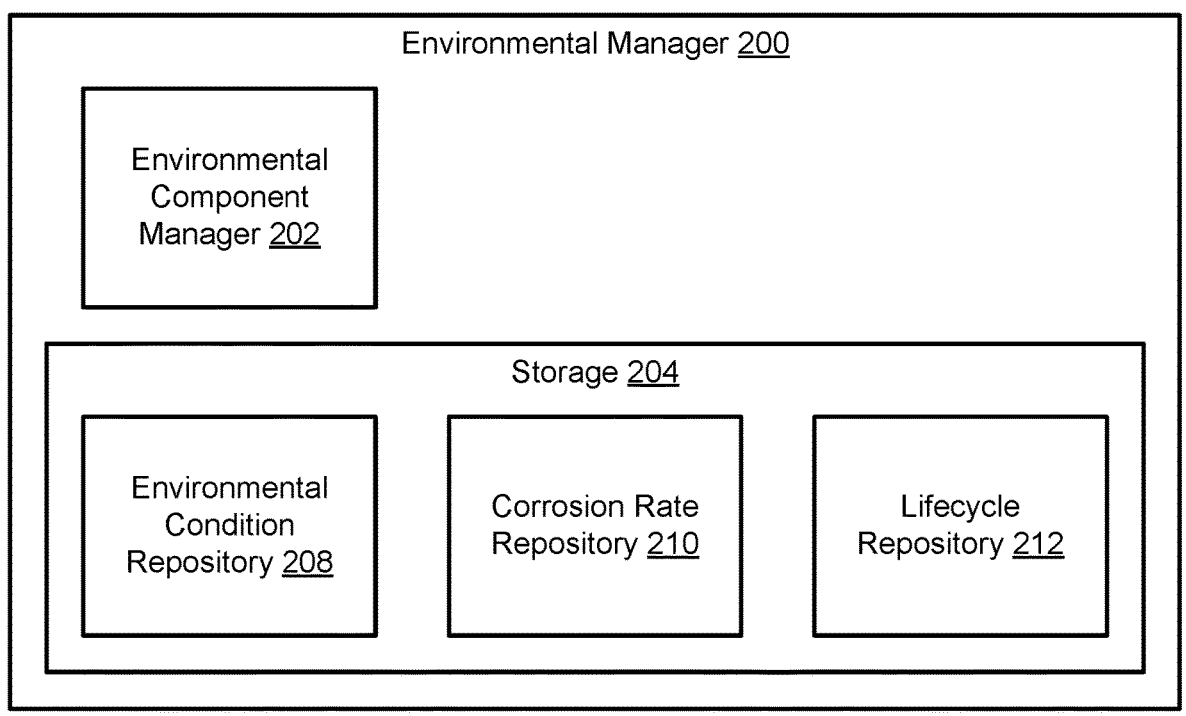
FIG. 2 shows a diagram of an environmental manager of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing components of an information handling system. An information handling system may be a system that provides computer implemented services. These services may include, for example, database services, electronic communication services, data storage services, etc.

To provide these services, the information handling system may include one or more computing devices. The computing devices may include any number of computing components that facilitate providing of the services of the information handling system. The computing components may include, for example, processors, memory modules, circuit cards that interconnect these components, etc.

During operation, these components may be exposed to gases that may cause the components to corrode. Corrosion may cause the components to fail prior to the computing device meeting its service life goals.

Embodiments of the invention may provide methods and systems that reduce the risk of corrosion related failures in information handling systems. To reduce the risk of corrosion related failures, the system may manage the components based, in part, on their risk of corrosion. To monitor their risk of corrosion, the rates of corrosion within the environments in which the components reside may be measured. By measuring the rates of corrosion within the environments, the impact of water vapor, chemical specifies, temperature, and/or other factors that impact corrosion may be taken into account. If the rate of corrosion is sufficient to risk premature failure of the components due to corrosion, the system may modify the environment proximate to the components to decrease the rate of corrosion.

To modify the environment, the system may increase the temperature of the ambient environment. For example, the system may decrease fan speeds or take other measures to cause the temperature of the environment proximate to the components to increase. Such increases may be implemented even when a component is operating outside of its nominal operating temperature range.

The system may also, for example, increase the temperature of gases being taken into the chassis of the information handling system, decrease the amount of water vapor in gases being taken into the chassis of the information handling system, or take other action to modify the temperature and/or relative humidity level in a manner that is likely to reduce the rate of corrosion. The rate of corrosion may be reduced to a level that the information handling system is likely to meet its service life goal prior to its components failing due to corrosion.

By doing so, a system in accordance with embodiments of the invention may be less likely to prematurely fail, be more likely to meet its service life goal, be able to accept a wider range of intake gas conditions, and/or may be less costly to operate by reducing the level of conditioning of gases taken into the chassis of the information handling systems.

FIG. 1.1 shows an information handling system (10) in accordance with one or more embodiments of the invention. The system may include a frame (110) and any number of chassis (e.g., 100A, 100B, 100C).

The frame (110) may be a mechanical structure that enables chassis to be positioned with respect to one another. For example, the frame (110) may be a rack mount enclosure that enables chassis to be disposed within it. The frame (110) may be implemented as other types of structures adapted to house, position, orient, and/or otherwise physically, mechanically, electrically, and/or thermally manage chassis. By managing the chassis, the frame (110) may enable multiple chassis to be densely packed in space without negatively impacting the operation of the information handling system (10).

A chassis (e.g., 100A) may be a mechanical structure for housing components of an information handling system. For example, a chassis may be implemented as a rack mountable enclosure for housing components of an information handling system. The chassis may be adapted to be disposed within the frame (110) and/or utilize services provided by the frame (110) and/or other devices.

Any number of components may be disposed in each of the respective chassis (e.g., 100A, 100B, 100C). These components may be portions of computing devices that provide computer implemented services, discussed in greater detail below.

When the components provide computer implemented services, the components may generate heat. For example, the components may utilize electrical energy to perform computations and generate heat as a byproduct of performing the computations. If left unchecked, buildup of heat within a chassis may cause temperatures of the components disposed within the chassis to exceed preferred ranges.

The preferred ranges may include a nominal range in which the components respectively operate (i) without detriment and/or (ii) are likely to be able to continue to operate through a predetermined service life of a component. Consequently, it may be desirable to maintain the temperatures of the respective components within the preferred range (e.g., a nominal range).

When a component operates outside of the preferred range, the service life of the component may be reduced, the component may not be able to perform optimally (e.g., reduced ability to provide computations, higher likelihood of error introduced into computations, etc.), and/or the component may be more likely to unexpectedly fail. The component may be subject to other undesirable behavior when operating outside of the preferred range without departing from the invention.

To operate components within the preferred range of temperature, the chassis may include air exchanges (e.g., 102). An air exchange (102) may be one or more openings in an exterior of a chassis that enables the chassis to exchange gases with an ambient environment. For example, a chassis may utilize air exchanges to (i) vent hot gases and (ii) intake cool gases. By doing so, the temperature of the gases within the chassis may be reduced. Consequently, the temperatures of components within the chassis may be reduced by utilizing the cooler gases taken into the chassis via an air exchange.

However, utilizing gases to cool components within a chassis may be problematic. The gases may not be benign. For example, the gases may be (i) chemically reactive, (ii) include humidity, and/or (iii) otherwise interact with components disposed within the chassis in an undesirable manner. The reaction between the gases used to cool the components and the components themselves (or other components proximate to the to-be-cooled components) may negatively impact the components disposed within the chassis.

For example, if the gases include a chemically reactive component (e.g., chlorine species), the gases may react (i.e., chemically react) with portions of the components disposed within the chassis. These reactions may damage portions of the components resulting in a decreased service life of the components.

In another example, if the gases include humidity, the humidity may condense resulting in water being disposed on the surface of the components. When water is disposed on the surface of components (even at very small levels), the water may chemically react with the components forming corrosion. The aforementioned reactions with the condensed water may damage the components or otherwise cause them to operate in an undesirable manner.

The potential reactions, discussed above, may cause numerous negative impacts. First, the reactions may impact the electrical conductivity of various components. For example, when metals react with chemically reactive species, condensed water vapor, etc., the metals may form chemical compounds that are substantially less conductive than the pure metals. The reduced conductivities of the components may negatively impact the electrical functionality of the components (e.g., circuits) disposed within the chassis.

Second, the reactions may impact the physical size of various components. For example, when metals chemically react, the products formed by the reactions may occupy significantly larger volumes than the unreacted metals (e.g., metal oxides vs elemental metals). The change in volumes of the reacted metals may negatively impact the electrical functionality of the components by, for example, forming open circuits by physically disconnecting various portions of the components from each other and/or other devices.

The potential reactions may cause other negative impacts beyond those discussed herein. The negative impacts may cause a device to fail prior to it meeting its service life. A service life may be a desired duration of operation of a component, device, or system.

To address the above and/or other potential issues, embodiments of the invention may provide methods, devices, and systems that manage environments within chassis. The environments may be managed to reduce the occurrence of reactions, between gases (that may include water vapor and/or reactive species) and components, that result in a reduction of the service life of (i) the component, (ii) a computing device of which the component is a member, and/or (iii) an IHS that incorporates the component due to premature failure of the aforementioned entities.

An environment within a chassis may be managed by reducing the likelihood of chemical reactions occurring due to the presence of condensed water vapor. To reduce the likelihood of chemical reactions occurring, the temperature and/or humidity level (e.g., relative humidity) may be manipulated to (i) reduce the likelihood of condensation from occurring, (ii) reduce the rate of chemical reactions occurring, and/or (iii) ensure that temperatures of components are within the predetermined ranges in which the operation of the components is nominal (e.g., to limit premature failure of components due to thermal conditions).

To determine how to manage the environment within the chassis, a system may monitor the actual rates of corrosion occurring within the chassis. The measured rates may be used alone or in conjunction with estimated rates of corrosion not measured directly to ascertain the corrosion rates occurring throughout the chassis. Based on the ascertained corrosion rates, the system may modify (i) the temperature within the chassis, (ii) humidity level within the chassis, (iii) gas flow rates within the chassis, (iv) temperature of gases being taken into the chassis for cooling purposes, and/or (v) source of gases being taken into the chassis for cooling purposes. The aforementioned modifications may be made to (a) limit the rate of corrosion, (b) reduce the cost of conditioning gases used for cooling purposes, and/or (c) meeting service life goals.

To further clarify the processes of managing the environments within the chassis, a diagram of an environment in which a chassis may reside is illustrated in FIG. 1.2 and a diagram of a chassis is provided in FIG. 1.3.

Turning to FIG. 1.2, FIG. 1.2 shows a top view diagram of a building (115) in which chassis may reside in accordance with one or more embodiments of the invention. The building (115) may house a data center (e.g., an aggregation of information handling systems) that includes any number of information handling systems (e.g., 10A, 10B). The information handling systems include chassis which may need to intake and exhaust gases for temperature regulation purposes.

To facilitate gas management within the building (115), the information handling systems may be organized into rows (or other groupings of information handling systems). In FIG. 1.2, the rows of information handling system extend from top to bottom along the page. To enable gases to be provided to the information handling systems (e.g., for temperature regulation purposes), an airflow conditioner (120) may be disposed within the building. The airflow conditioner (120) may provide supply airflow (122) and take in a return airflow (124). These airflows are illustrated as arrows having dashed tails.

The supply airflow (122) may be at lower temperature than the return airflow (124). Consequently, when information handling systems obtain portions of the supply airflow (122), the information handling systems may be able to utilize the supply airflow (122) to cool components disposed within the chassis of the information handling systems. For example, gases from the supply airflow (122) may be passed by components disposed within chassis of information handling systems that are at elevated temperatures. The gases may be at a lower temperature than the components. Consequently, thermal exchange between the gases in the components may decrease the temperature of the components.

After utilizing the gases from the supply airflow (122), the information handling systems may exhaust the gases as the return airflow (124). After being exhausted from the information handling systems, the return airflow (124) may be obtained by the airflow conditioner (120), cooled, and recirculated as the supply airflow (122).

In addition to cooling the return airflow (124), the airflow conditioner (120) may be capable of obtaining gases from other areas (e.g., outside of the building), reducing the humidity level of an airflow, and/or otherwise conditioning gases for use by information handling systems and/or other devices.

To manage the aforementioned process, a system environmental manager (130) may be disposed within the building (115) or at other locations. The system environmental manager (130) may be a computing device programmed to (i) obtain information regarding the operation of the information handling systems and (ii) set the operating points of the airflow conditioner (120). By doing so, the system environmental manager (130) may cause the airflow conditioner (120) to provide gases to the information handling systems having a temperature and/or humidity level that may better enable the information handling systems to regulate their respective environmental conditions within the chassis of the respective information handling systems.

The airflow conditioner (120) may include functionality to granularly, or at a macro level, modify the temperature and/or humidity level of the supply airflow (122). Consequently, different information handling systems (or groups thereof) may receive different supply airflows (e.g., 122) having different characteristics (e.g., different temperatures and/or humidity levels, different sources, etc.).

Conditioning the return airflow (124) or gases obtained from outside of the building (115) may be costly, consume large amount of electricity, or may otherwise be undesirable. To reduce these costs, the system environmental manager (130) may set the operating point (e.g., desired temperature/humidity levels of different portions of the supply airflow (122)) of the airflow conditioner (120) to only provide the minimum necessary characteristics required by each of the IHSs. By doing so, the cost of providing the supply airflow (122) having characteristics required to meet the environmental requirements of the chassis of the information handling systems may be reduced.

To decide how to set the operating points of the airflow conditioner (120), the system environmental manager (130) may obtain and/or be provided information regarding the environmental conditions within each of the chassis. For example, the system environmental manager (130) may be operably connected to environmental managers of each of the chassis and/or the airflow conditioner (120) via any combination of wired and/or wireless networks. The respective environmental managers of the chassis may provide such information to the system environmental manager (130) and/or service requests regarding the operating points of the airflow conditioner (120) via the operable connections.

The system environmental manager (130) may be implemented using a computing device. For additional details regarding computing devices, refer to FIG. 6. The system environmental manager (130) may perform all, or a portion, of the methods illustrated in FIGS. 4.1-4.3 while providing its functionality.

Turning to FIG. 1.3, FIG. 1.3 shows a diagram of a chassis (100A) in accordance with one or more embodiments of the invention. A chassis may be a portion of an IHS and/or house all, or a portion, of an IHS. An information handling system may include a computing device that provides any number of services (e.g., computing implemented services). To provide services, the computing device may utilize computing resources provided by computing components (140). The computing components (140) may include, for example, processors, memory modules, storage devices, special purpose hardware, and/or other types of physical components that contribute to the operation of the computing device. For additional details regarding computing devices, refer to FIG. 6.

Because the computing device uses computing components (140) to provide services, the ability of the computing device to provide services is limited based on the number and/or quantity of computing devices that may be disposed within the chassis. For example, by adding additional processors, memory modules, and/or special purpose hardware devices, the computing device may be provided with additional computing resources which it may be used to provide services. Consequently, large number of computing components that each, respectively, generate heat may be disposed within the chassis.

To maintain the temperatures of the computing components (140) (and/or other types of components) within a nominal range, gases may be taken in through an air exchange (102). The gases may be passed by the computing components (140) to exchange heat with them. The heated gases may then be expelled out of another air exchange (102).

However, by intaking and expelling gases used for cooling purposes, the components disposed within the chassis (100A) may be subject to degradation due to corrosion. For example, as discussed above, the gases may include components such as humidity that may chemical react with the computing components (140) and/or other types of components disposed in the chassis (100A). The chemical reactions may damage the structure and/or change the electrical properties of the computing components (140). These changes may negatively impact the ability of the computing device to provide its functionality.

For example, the computing device may have a service life during which it is expected that the computing device will be likely to provide its functionality. However, changes in the structure and/or electrical properties of these components due to exposure to humidity or other components of the gases used for temperature regulation purposes may cause the components to prematurely fail ahead of the service life of the computing device.

In general, embodiments of the invention provide methods, devices, and systems for managing the internal environments of chassis to reduce the likelihood of premature failure of computing components (140). By reducing the likelihood of the occurrence of premature failures of computing components, the computing devices disposed within the chassis (100A) may be more likely to meet their respective service life goals, have lower operation costs, and/or require fewer repairs during their respective service life. For additional details regarding the computing components (140), refer to FIG. 1.4.

To manage the internal environment (104) of the chassis, the chassis (100A) may include a chassis environmental manager (150). The chassis environmental manager (150) may provide environmental management services. Environmental management services may include (i) obtaining information regarding the rates of corrosion occurring within the chassis, (ii) determining, based on the corrosion rates, whether the devices within the chassis are likely to meet their service life goals, and (iii) modifying the operation (e.g., modifying operating points) of environmental control components (152) and/or characteristics of gases taken into the chassis to reduce the likelihood of premature failure of components disposed within the chassis (100A) due to corrosion. For additional details regarding the chassis environmental manager (150), refer to FIG. 2.

While illustrated in FIG. 1.3 as a physical structure, as will be discussed with respect to FIG. 2, the chassis environmental manager (150) may be implemented as a logical entity (e.g., a program executing using the computing components (140)). For example, a computing device disposed in the chassis may host a program that provides the functionality of the chassis environmental manager (150).

To enable the chassis environmental manager (150) to provide its functionality, the chassis (100A) may include one or more corrosion detectors (e.g., 154) and temperature detectors (e.g., 156). These detectors may enable the rates of corrosion of various components disposed within the chassis (100A) to be determined. These detectors may be implemented as sensors or other types of physical devices that are operably connected to the chassis environmental manager (150). In some embodiments of the invention, the functionality of the temperature detectors may be provided by, in all or in part, the computing components (140). For example, the computing components (140) may include functionality to report their respective temperatures and/or temperatures of the internal environment (104) of the chassis (100A). For additional details regarding corrosion detectors (154), refer to FIG. 1.5.

The chassis (100A) may also include environmental control components (152). The environmental control components (152) may include physical devices that include functionality to modify characteristics (e.g., temperature, humidity level, airflow rates/directions) of the internal environment (104). The chassis (100A) may include any number of environmental control components disposed at any number of locations within the chassis.

For example, the environmental control components (152) may include gas movers such as fans. The fans may be able to modify the rate of gases being taken into and expelled from the chassis (100A) through the air exchangers (e.g., 102). The rate of intake and exhaust of gases may cause an airflow to be generated within the internal environment (104). The airflow may be used to modify the rate of thermal exchange between the computing components (140) and the internal environment (104) (e.g., an environment proximate to the computing components (140)).

In another example, the environmental control components (152) may include heaters. The heaters may be able to modify the temperature of the internal environment (104). For example, heaters may be disposed at a front of the chassis (e.g., where gases are taken into the chassis) and/or about different locations within the chassis. These heaters may be used to generally and/or locally heat the internal environment (104). By doing so, the relative humidity level and temperature of the internal environment (104) proximate to the computing components (140) and/or different components may be controlled. The temperature and/or relative humidity level may be utilized to limit, reduce, or otherwise control corrosion rates of the computing components (140).

In a still further example, the environmental control components (152) may include components that are not disposed in the chassis (not shown). For example, the environmental control components may include an airflow conditioner discussed with respect to FIG. 1.2. These external components may be used in conjunction with the environment control components disposed within the chassis to manage the temperature and/or relative humidity levels throughout the internal environment (104) of the chassis.

The chassis (100A) may include any number and type of environmental control components without departing from the invention. Any of the environmental control components may be implemented using physical devices operably connected to and/or controllable by the chassis environmental manager (150) and/or a system environmental manager (e.g., 130, FIG. 1.2) (alone or in combination). Any number of chassis environmental managers and system environmental managers may cooperatively operate to control the temperature and/or relative humidity levels of the internal environments of any number of chassis to control the rate of corrosion occurring within the chassis and/or manage the thermal load generated by the computing components (140) and/or other components.

To cooperatively operate, the chassis environmental managers and system environmental managers may be operably connected to one another (e.g., via wired and/or wireless networks). The aforementioned components may share information with one another (e.g., detector data, operating set points of different environmental control components, etc.). These components may implement any type of model for controlling and/or delegating control of the system for temperature, relative humidity level, and/or corrosion rate management purposes. When providing their respective functionalities, these components may perform all, or a portion, of the methods illustrated in FIGS. 4.1-4.3. Any of these components may be implemented using a computing device. For additional details regarding computing devices, refer to FIG. 6.

While the chassis (100A) of FIG. 1.3 has been illustrated as including a limited number of specific components, a chassis in accordance with one or more embodiments of the invention may include additional, fewer, and/or different components without departing from the invention. Additionally, while the chassis (100A) is illustrated as having a specific form factor (e.g., rack mount), a chassis in accordance with embodiments of the invention may have different form factors without departing from the invention.

As discussed above, the chassis (100A) may house computing components (140). Turning to FIG. 1.4, FIG. 1.4 shows a diagram of computing components (140) in accordance with one or more embodiments of the invention. The computing components (140) may enable computing devices to provide services, as discussed above.

The computing components (140) may include any number of hardware devices (142). The hardware devices (142) may include, for example, packaged integrated circuits (e.g., chips). The hardware devices (142) may enable any number and type of functionalities to be performed by a computing device.

The computing components (140) may also include a circuit card (144). The circuit card (144) may enable any of the hardware devices (142) to be operably connected to one another and/or other components not illustrated in FIG. 1.4. For example, the circuit card (144) may be a multiplayer printed circuit board that includes circuitry.

The circuit card (144) may include traces (146) that electrically interconnect various hardware devices (142) to one another and/or other components not illustrated in FIG. 1.4. The traces (146) may be formed out of conductive materials such as copper thereby enabling electrical power to be provided to the hardware devices (142), electrical signals to be distributed among the hardware devices (142), etc.

Returning to the hardware devices (142), these devices may consume electrical power and generate heat as a byproduct of performing their functionality. Further, the hardware devices (142) may have some sensitivity to temperature. For example, the hardware devices (142) may only operate nominally (e.g., as designed) when the temperatures of the respective hardware devices (142) are maintained within a preferred temperature range. Consequently, all, or a portion, of the hardware devices (142) may require some level of cooling to continue to operate nominally.

As discussed above, to facilitate cooling of the hardware devices (142), airflows within the chassis may be generated by environmental control components such as fans, heaters, etc. The airflows may cause gases that are at different temperatures and/or relative humidity levels to be taken into the chassis, used for cooling purposes, and then expelled from the chassis.

However, this processes may be problematic because the gases used for cooling purposes may also contribute to corrosion being formed on, for example, the traces (146), interconnections between the traces (146) and the hardware devices (142), etc. For example, when the traces (146) are exposed to gases that include humidity, the metals of the traces (146) may react with the gases thereby forming corrosion.

The corrosion may, if kept to a low level, not impact the ability of the hardware devices (142) to perform their functionality over the course of the desired lifetime (e.g., service life) of a computing device. In contract, if the rate of corrosion rises to a high enough level, the corrosion may negatively impact the ability of the hardware devices (142) to perform their respective functionalities to a level that causes the computing device to fail. Consequently, the computing device and corresponding IHS may fail prior to it meeting its desired service life due to corrosion.

For example, if an IHS has a desired service life of 5 years, corrosion may cause one of the traces (146) to fail prior to 5 years of service thereby causing the IHS to prematurely fail.

While the computing components (140) are illustrated in FIG. 1.4 as including specific numbers and specific types of components, computing component in accordance with one or more embodiments of the invention may include additional, different, and/or fewer components without departing from the invention.

To manage an environment within a chassis, a chassis in accordance with embodiments of the invention may include a corrosion detector. FIG. 1.5 shows a diagram of a corrosion detector (154) in accordance with one or more embodiments of the invention.

The corrosion detector (154) may be a physical device that is able to ascertain the rate of corrosion occurring and/or a total amount of corrosion that has occurred. As noted above, the rate of corrosion may depend on an environment in which a component resides and, consequently, may change over time as the environment in which the component resides changes over time.

To ascertain the rate of corrosion and/or amount of corrosion that has occurred, the corrosion detector (154) may include a stimulus generator (160) and/or one or more sensing elements. The sensing elements may be physical structures that are sensitive to corrosion. For example, the sensing elements may be implemented as sensing loops (162). The sensing loops (162) may be traces disposed on a surface of a circuit card (164). The traces may be formed of a material that is subject to corrosion and that changes its properties as it forms corrosion.

For example, the sensing loops (162) may be implemented as copper traces having a predetermined length. The predetermined length may cause the sensing loops (162) to have a predetermined resistance that changes as the sensing loops corrode. Consequently, measuring the resistance of the sensing loops may enable the rates of corrosion to be determined as well as a total amount of corrosion that has taken place.

To measure the resistance of the sensing loops, the stimulus generator (160) may generate a voltage potential across the ends of the sensing loops. The applied voltage may result in a current running through the sensing loops (162). The quantity of current may be measured to determine the resistance (e.g., applied voltage divided by the measured current) of the sensing loops. Based on the resistance, the amount of corrosion on the sensing loops may be ascertained.

For example, the sensing loops may be assumed to have a predetermined cross section of a pure metal. When corrosion occurs, this cross section of pure metal may be reduced in cross section resulting in an increase in resistance of the sensing loops. The measured resistance of the sensing loops may be utilized to determine the current cross section of the sensing loops thereby enabling an amount of corrosion (e.g., a 1 µm thick layer of metal that has corroded) of the sensing loops to be determined.

The stimulus generator (160) may be implemented using, for example, integrated circuits. The integrated circuits may include, for example, instrumentation operational amplifiers, power supplies, precision resistors, current mirrors, etc. The integrated circuits may include additional, fewer, and/or different types of circuits to enable the stimulus generator to ascertain the amount that a sensing element has corroded.

The stimulus generator (160) may be operably connected to an environmental manager. Consequently, the environmental manager may initiate measurements and obtain measurements of corrosion that has occurred.

While the corrosion detector (154) in FIG. 1.5 has been illustrated and described as using resistive detection modalities, other testing modalities may be employed without departing from the invention. For example, the changes in capacitive or inductive characteristics of arrangements of a material subject to corrosion may be used to ascertain the quantity of corrosion that has occurred.

Additionally, a corrosion detector in accordance with embodiments of the invention may include different components without departing from the invention. For example, the corrosion detector may include an electrically driven resonator (e.g., a quart crystal resonator) operably coupled to a slug (e.g., a finite quantity of) of a material that may corrode in the presence of airflows. The slug's conductivity may change as it corrodes thereby changing the resonant frequency of the resonator. Consequently, the resonant frequency of the electrically driven resonator may be utilized to determine that rate of corrosion for components formed of materials similar to the slug. Any number of resonators may be operably connected to slugs of any number of different materials to ascertain the likely corrosion rates of various components and portions thereof.

To ascertain the rates of corrosion that are occurring, the aggregate amount of corrosion that has occurred at different points in time may be used to calculate a rate of change of corrosion.

While the corrosion detector (154) has been illustrated in FIG. 1.5 as included specific numbers and types of components, a corrosion detector (154) in accordance with embodiments of the invention may include different, fewer, and/or additional components without departing from the invention.

To reduce the likelihood of premature failure of IHSs, an IHS in accordance with embodiments of the invention may include an environmental manager. Turning to FIG. 2, FIG.

2 shows a diagram of an environmental manager (200) in accordance with one or more embodiments of the invention. The system environmental manager (130) and/or chassis environmental manager (150) illustrated in FIGS. 1.2 and 1.3, respectively, may be similar to the environmental manager (200).

As discussed above, the environmental manager (200) may provide environmental management services. Environmental management services may reduce the likelihood that IHSs fail prematurely (e.g., prior to meeting service life goals) due to corrosion of components of the IHSs.

In one or more embodiments of the invention, the environmental manager (200) is implemented using computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the environmental manager (200) described through this application and all, or a portion, of the methods illustrated in FIGS. 4.1-4.3. The environmental manager (200) may be implemented using other types of computing devices without departing from the invention. For additional details regarding computing devices, refer to FIG. 6.

In one or more embodiments of the invention, the environmental manager (200) is implemented using distributed computing devices. As used herein, a distributed computing device refers to functionality provided by a logical device that utilizes the computing resources of one or more separate and/or distinct computing devices. For example, in one or more embodiments of the invention, the environmental manager (200) is implemented using distributed devices that include components distributed across any number of separate and/or distinct computing devices. In such a scenario, the functionality of the environmental manager (200) may be performed by multiple, different computing devices without departing from the invention.

To provide environmental management services, the environmental manager (200) may include an environmental component manager (202) and a storage (204). Each of these components is discussed below.

The environmental component manager (202) may manage the components of the chassis and/or other components that may be used to control the characteristics (e.g., temperature, humidity level, airflow rates, etc.) of the internal environment of the chassis. To manage them, the environmental component manager (202) may (i) obtain information regarding the environmental conditions within the chassis including temperatures and corrosion rates, (ii) determine, using the environmental information, whether the IHS is likely to prematurely fail, and (iv) if the IHS is unlikely to meet it service life goals due to premature failure, modify the characteristics of the internal environment of the chassis to improve the likelihood that the IHS will meet is service life goals.

To obtain information regarding the environmental conditions, the environmental component manager (202) may request such information from computing components (e.g., temperatures), sensors (e.g., corrosion detectors), and/or other types of devices (e.g., components external to the chassis). In response, the aforementioned components may provide the requested information to the environmental component manager (202). The environmental component manager (202) may store the aforementioned information as part of an environmental condition repository (208).

To ascertain whether an IHS is likely to prematurely fail due to corrosion, the environmental component manager (202) may determine a total amount of corrosion that has likely occurred, estimate the rate that will occur in the future, and use the previous amount and current rate to determine whether the computing device is likely to prematurely fail. To make this determination, the environmental component manager (202) may utilize a lifecycle repository (212). The lifecycle repository (212) may specify information that may be used to ascertain whether a premature failure will occur based on corrosion. For example, the lifecycle repository (212) may specify a total amount of corrosion that will cause various components of a computing device to fail. Based on this aggregate amount and the corrosion rate, the environmental component manager (202) may ascertain whether the amount of corrosion specified by the lifecycle repository (212) will be exceeded prior to the occurrence of the service life of the IHS.

If it is determined that the IHS will prematurely fail, the environmental component manager (202) may modify the operation of one or more environmental control components to reduce the corrosion rate within the chassis. For example, the environmental component manager (202) may increase the ambient temperature within the chassis, decrease the relative humidity level, modify airflow rates within the chassis, and/or otherwise modify the internal environment of the chassis to reduce the rate that corrosion occurs in the chassis. By doing so, the point in time at which the IHS is likely to fail due to corrosion may be pushed into the future thereby reducing the likelihood that the IHS will prematurely fail ahead of its service life being completed.

When providing its functionality, the environmental component manager (202) may utilize the storage (204) by storing and using previously stored data structures.

To provide the above noted functionality of the environmental component manager (202), the environmental component manager (202) may perform all, or a portion, of the methods illustrated in FIGS. 4.1-4.3.

In one or more embodiments of the invention, the environmental component manager (202) is implemented using a hardware device including circuitry. The environmental component manager (202) may be implemented using, for example, a digital signal processor, a field programmable gate array, or an application specific integrated circuit. The environmental component manager (202) may be implemented using other types of hardware devices without departing from the invention.

In one or more embodiments of the invention, the environmental component manager (202) is implemented using computing code stored on a persistent storage that when executed by a processor performs all, or a portion, of the functionality of the environmental component manager (202). The processor may be a hardware processor including circuitry such as, for example, a central processing unit or a microcontroller. The processor may be other types of hardware devices for processing digital information without departing from the invention.

In one or more embodiments disclosed herein, the storage (204) is implemented using devices that provide data storage services (e.g., storing data and providing copies of previously stored data). The devices that provide data storage services may include hardware devices and/or logical devices. For example, storage (204) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (204) may include a memory device (e.g., a dual in line memory device) in which data is stored and from which copies of previously stored data are provided. In another example, storage (204) may include a persistent storage device (e.g., a solid state disk drive) in which data is stored and from which copies of previously stored data are provided. In a still further example, storage (204) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (204) may store data structures including an environmental condition repository (208), a corrosion rate repository (210), and a lifecycle repository (212). Each of these data structures is discussed below.

The environmental condition repository (208) may include one or more data structures that include information regarding the environmental conditions within a chassis. For example, when temperature and/or corrosion data is read from a detector, the read information may be stored in the environmental condition repository (208). Consequently, a historical record of the environmental conditions in the repository may be maintained.

In some embodiments of the invention, the environmental condition repository (208) may only include the most up to date information regarding the environmental conditions within the chassis. For example, only the most recent detector readings may be stored in the environmental condition repository (208).

The environmental condition repository (208) may include any type and quantity of information regarding the environmental conditions within the repository. For example, the environmental condition repository (208) may include temperature sensor data from discrete temperature sensors and/or temperature sensors integrated into computing components (and/or other types of devices). In another example, the environmental condition repository (208) may include corrosion rates from discrete or integrated corrosion detectors (e.g., on board a circuit card). In a still further example, the environmental condition repository (208) may include airflow rate data regarding the flow of gases within a chassis.

In addition to the sensor data, the environmental condition repository (208) may include spatial data regarding the relative locations of components within a chassis. For example, some components may be disposed away from corrosion detectors. Consequently, it may not be possible to directly measure the temperature and/or corrosion such components. The spatial data may be used to estimate, using measured temperatures and/or corrosion, the likely corrosion rates of the components.

The corrosion rate repository (210) may include one or more data structures that include information regarding the rates at which components disposed in the chassis have corroded. For example, the corrosion rate repository (210) may include tables associated with different components disposed within the chassis. Each of these tables may include the measured and/or estimated corrosion of the components.

The tables may also include the time at which the corrosion was measured. Consequently, the rates of corrosion of the components may be ascertained using the information included in the tables (e.g., corrosion at time T1−corrosion at time T2/the different between T1 and T2).

The lifecycle repository (212) may include one or more data structures that include information regarding the desired life of components disposed in a chassis of an information handling system. For example, the lifecycle repository (212) may specify how much corrosion may occur with respect to different components before the respective components are likely to fail. The aforementioned information may be used in conjunction with determined corrosion rates and quantities of corrosion included in the corrosion rate repository (210) to determine whether it is likely that a component, computing device, and/or IHS is likely to fail prior to its desired service life. For additional details regarding the lifecycle repository (212), refer to FIG. 3.

While the data structures stored in storage (204) have been described as including a limited amount of specific information, any of the data structures stored in storage (204) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein. Any of these data structures may be implemented using, for example, lists, table, linked lists, databases, or any other type of data structures usable for storage of the aforementioned information.

While the environmental manager (200) of FIG. 2 has been described and illustrated as including a limited number of specific components for the sake of brevity, an environmental manager in accordance with embodiments of the invention may include additional, fewer, and/or different components than those illustrated in FIG. 2 without departing from the invention.

Further, any of the components may be implemented as a service spanning multiple devices. For example, multiple computing devices housed in multiple chassis may each run respective instances of the environmental component manager (202). Each of these instances may communicate and cooperate to provide the functionality of the environmental component manager (202).

Figure 3:
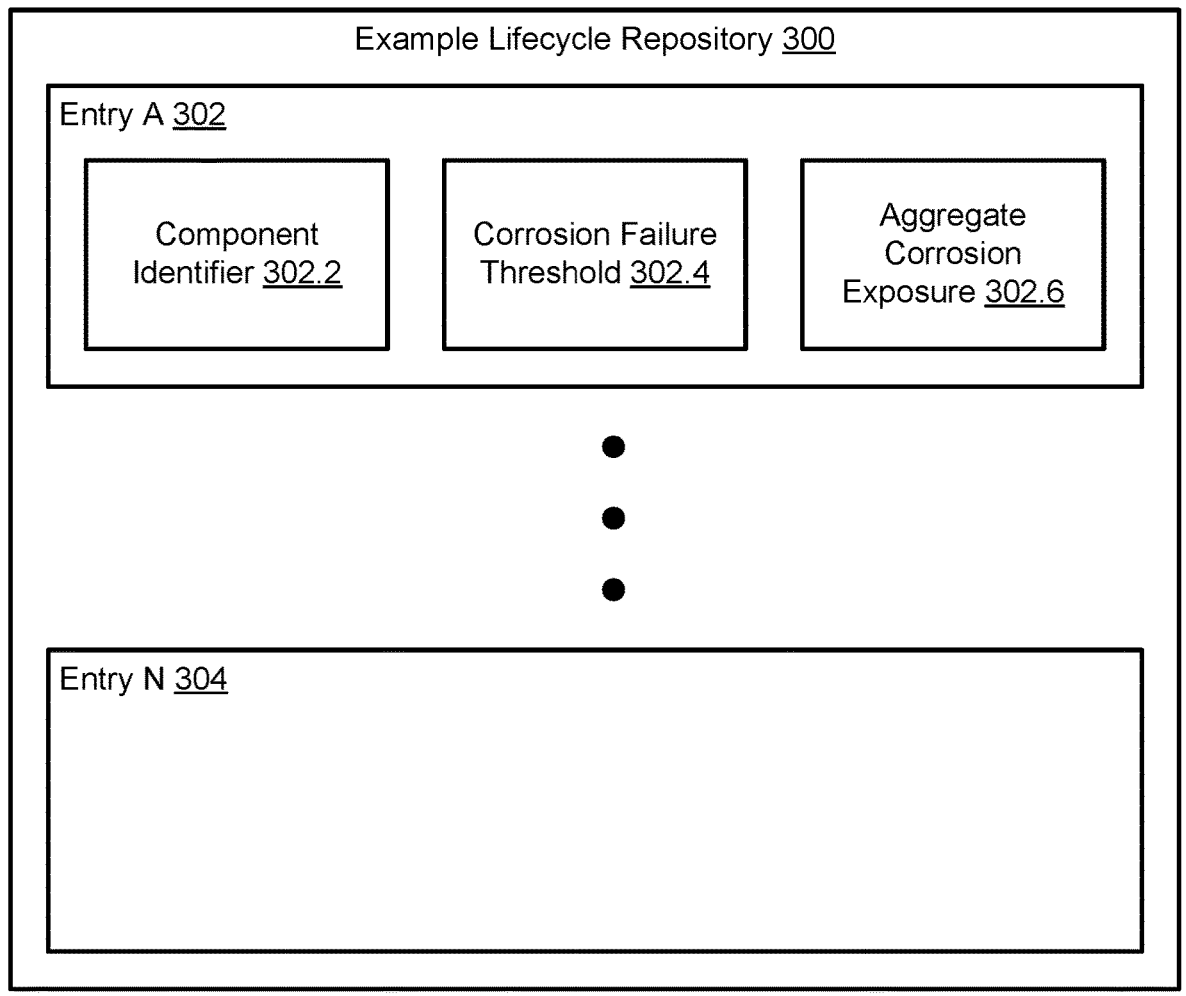
FIG. 3 shows a diagram of an example lifecycle repository in accordance with one or more embodiments of the invention.

As discussed above, the environmental manager (200) may utilize a lifecycle repository when performing its functionality. FIG. 3 shows a diagram of an example lifecycle repository (300) that may be used by the environmental manager (200) when providing its functionality.

In one or more embodiments of the invention, the example lifecycle repository (300) includes any of number entries (e.g., 302, 304). Each of the entries may include a component identifier (302.2), corrosion failure threshold (302.4), and aggregate corrosion exposure (302.6).

The component identifier (302.2) may be an identifier of a component associated with the entry. In other words, the component associated with the data included in the entry.

The corrosion failure threshold (302.4) may specify a quantity of corrosion that, if exceeded, is likely to result in a failure of the component corresponding to the component identified by the component identifier (302.2).

The aggregate corrosion exposure (302.6) may specify the amount of corrosion that is estimated to have occurred to the component identified by the component identifier (302.2). For example, whenever the amount of corrosion is measured by a corrosion detector, the aggregate corrosion exposure (302.6) to reflect the amount that is estimated to have occurred to the component identified by the component identifier (302.2).

The estimate may be made based on, for example, the relative location of the component with respect to the corrosion detector, a temperature differential that may exist between the corrosion detector and the component, and/or other factors that may cause the amount of measured corrosion of the corrosion detector to different from that which the component is likely to have suffered. For example, differences in temperatures, materials, and/or other factors may cause the component to have an increased or decreased level of corrosion when compared to that measured by a corrosion detector. The aggregate corrosion exposure (302.6) may reflect that difference when compared to the amount of corrosion specified by the corrosion rate repository (210).

While the example lifecycle repository (300) has been described as including a limited amount of specific information, the example lifecycle repository (300) may include additional, less, and/or different information without departing from the embodiments disclosed herein. Further, the example lifecycle repository (300) may be combined, subdivided into any number of data structures, may be stored in other locations (e.g., in a storage hosted by another device), and/or spanned across any number of devices without departing from the embodiments disclosed herein. Additionally, while described as being implemented using a list of entries (302, 304), the example lifecycle repository (300) may be implemented using different types of data structures (e.g., databases, linked lists, tables, etc.) without departing from the invention.

Returning to FIG. 2, the environmental manager (200) may provide environmental services. FIGS. 4.1-4.3 illustrate methods that may be performed by the environmental manager (200) of FIG. 2 when providing environmental management services.

FIG. 4.1 shows a flowchart of a method in accordance with one or more embodiments of the invention. The method depicted in FIG. 4.1 may be used to manage the internal environment of a chassis in accordance with one or more embodiments of the invention. The method shown in FIG. 4.1 may be performed by, for example, an environmental manager (e.g., 200, FIG. 2). Other components of the system illustrated in FIGS. 1.1-1.5 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, an aggregate amount of corrosion that is likely to cause a component to prematurely fail is identified. The component may be a computing component disposed in a chassis. The aggregate amount of corrosion may be identified based on a lifecycle repository. Lifecycle repository may specify an amount of corrosion that if exceeded results in the likely failure of the component.

In step 402, a rate of corrosion associated with the component is obtained. The rate of corrosion associated with the component may be obtained using a corrosion detector.

In one or more embodiments of the invention, the rate of corrosion is determined based on a direct measurement of the rate of corrosion using the corrosion detector. For example, the corrosion detector may be in such close proximity to the component that a measurement by the corrosion detector is likely to accurately predict the amount of corrosion of the component that has occurred.

In one or more embodiments of the invention, the rate of corrosion is determined based on indirect measurement of the rate of corrosion. The indirect measurement of the rate of corrosion may include first measuring the rate of corrosion using a corrosion detector that is not immediately proximate to the component. The indirect measurement of the rate of corrosion may also include measuring a first temperature of the ambient environment proximate to the corrosion detector and a second temperature of the ambient environment proximate to the component.

For example, the temperature the environment proximate to the corrosion detector may be measured using discrete detector. In contrast, the temperature of the environment proximate to the component may be measured using discrete detector or a detector built into the component such as an integrated thermistor or other temperature sensor.

Using the measured rate of corrosion and the two temperatures, the rate of corrosion of the component may be estimated. As noted above, as the temperature increases the rate of corrosion decreases (assuming the amount of humidity remains constant). Consequently, if the temperature differential between the first and second temperatures indicates that the component has been as a higher temperature in the environment proximate to the corrosion detector, then it is likely that the component has corroded less than is indicated by the corrosion measurement by the corrosion detector. The differentials between these temperatures and corresponding increases or decreases in corrosion rates may be characterized in a laboratory setting and programmed into the environmental manager. Consequently, the environmental manager may have access to a functional relationship between the temperature differential and difference in the amount of corrosion that has occurred with respect to the corrosion detector and the component. Accordingly, the amount of corrosion of the component may be estimated based on the temperature differential and the amount of corrosion reported by the corrosion detector.

To ascertain the rate of corrosion associated with the component, the amount of corrosion associated with the component may be calculated at two different points in time using the direct and/or indirect method, as discussed above. The rate may then be calculated using the aggregate amounts of corrosion that has taken place.

In one or more embodiments of the invention, the rate of corrosion associated with the component is obtained using the method illustrated in FIG. 4.2. The rate of corrosion associated with the component may be obtained using other methods without departing from the invention.

In step 404, it is determined whether the rate of corrosion indicates a premature failure of the component. The determination may be made by using the rate of corrosion to determine whether the component is likely to prematurely fail before the service life the component is met. For example, it may be assumed that the rate of corrosion will remain constant and the duration of time between the current point in time and the future point in time at which failure is likely to occur may be determined. The future point in time may then be compared to the service life of the component to ascertain whether the rate of corrosion will result in a premature failure that occurs prior to the service life of the component being met.

The determination may be made by comparing the amount of corrosion of the component that has occurred and the corrosion rate to a maximum amount of corrosion that can occur before failure of the component is likely (e.g., specified in a lifecycle repository). In other words, solving the equation $C_f = C_c + T*C_r$ where $C_f$ is the amount of corrosion that can occur before premature failure is likely to occur, $C_c$ is the amount of corrosion that has already occurred, $C_r$ is the corrosion rate determined in step 406, and T is the unknown amount of time until premature failure will occur due to corrosion. If the amount of time until premature failure indicates that failure of the component will occur before the desired service life of the component occurs, it is determined that the corrosion rates indicates a premature failure of the component will occur.

In one or more embodiments of the invention, the determination is made by estimating the future rates of corrosion (and/or total amounts of corrosion) using a predictive model. The predictive model may be, for example, machine learning, a stochastic method, a regression technique (e.g., linear regression/curve fitting), or any other method of using historical data to predict future data.

The historical corrosion and/or corrosion rates obtained in step 402 may be used as training data to train a predictive model. For example, the environmental conditions (e.g., rates of corrosion over a period of time, etc.) during a first period of time may be associated with rates of corrosion that occur in a second period of time in the future (e.g., a past/present to future relationship). Alternatively, or complementary, the rates of corrosion during a first period of time may be associated with rates of corrosion that occur in the second, future period of time. These rates may be used as the training basis for the predictive model.

The training data may also be based, in part, on environmental conditions within a chassis. For example, while the rates of corrosion are obtained in step 402, temperatures, relative levels of humidity, and/or other environmental conditions may also be monitored using corresponding detectors. Consequently, associations between past environmental conditions and/or rates of corrosion may be associated with future rates of corrosion/absolute amounts of corrosion using the obtained data.

After being trained on the environmental conditions and/or corrosion rates, the predictive model may be used to then predict the future levels of corrosion of the component based on the historical data (e.g., using the trained model). For example, temperature, relative humidity level, and/or corrosion rates may be used as input to the trained predictive model and the predictive model may generate, based on the input, the future rates of corrosion and/or absolute amounts of corrosion that will occur over a future period of time. The predicted future levels of corrosion may specify, for example, the amount of corrosion of the component at different points in the future and/or the rates of change of the corrosion at different points in time in the future based on environmental conditions and/or rates of corrosion that have been measured.

These predictions may be used to ascertain when the corrosion risk of the component indicates a premature failure (e.g., whether the component will fail prior to meeting service life goals). If the component will not meet is service life goals based on the prediction, the corrosion risk may indicate the premature failure of the component.

If it is determined that the rate of corrosion indicates a premature failure of the component, the method may proceed to step 406. If it is determined that the rate of corrosion does not indicate premature failure of the component, the method may proceed to step 408.

In step 406, an environmental control modification that will remediate the premature failure is identified. The environmental control modification may be a change in the operation of one or more environmental control components.

For example, the environmental control modification may be a decrease in a rate of airflow within the internal volume of a chassis, an increase in the temperature of gases taken into the chassis for cooling purposes, the decrease in the amount of humidity in the gases taken into the chassis for cooling purposes, and/or other change that impacts the conditions of the environment inside of the chassis.

In one or more embodiments of the invention, the environmental control modification is identified based on the rate of corrosion. For example, the environmental control modification may be identified in a manner that decreases the rate of corrosion to a rate such that the component will not fail prior to the completion of the service life of the component.

Using the identified rate of corrosion, a corresponding modification to the internal environment of the chassis may be identified that results in the component not being subject to premature failure. For example, the modification to the internal environment of the chassis may be to increase the temperature of the ambient environment within the chassis. In such a scenario, rate of airflow within the chassis may be decreased or heaters may be used to increase the temperature of the ambient environment within the chassis. Consequently, the rate of corrosion of the component may be decreased to a level which will prevent premature failure of the component.

In one or more embodiments of the invention, the environmental control modification is identified using the method illustrated in FIG. 4.3. The environmental control modification may be identified using other methods without departing from the invention.

In step 410, the operation of at least one environmental control component is updated based on the environmental control modification. For example, the operating point of the at least one environmental control component may be updated to cause the environmental control modification determined in step 406 to be implemented.

The method may end following step 410.

Returning to step 404, the method may proceed to step 408 when the rate of corrosion does not indicate a premature failure of the component.

In step 408, an environmental control modification that will reduce the energy consumption rate used for environmental management is determined.

Maintaining the internal environment of the chassis may be an energy intensive task. For example, air movers may consume electrical power to cause air to flow throughout the chassis. Similarly, airflow conditioning systems that provide conditioned air to the chassis may be costly to operate. In step 408, an environmental control modification that reduces the energy consumption rate may be implemented at the cost of an increased rate of corrosion of the component.

For example, the environmental control modification may be to provide unconditioned gases to the chassis for cooling purposes. In other words, reducing the amount of energy used to condition gases invited to the chassis. By doing so, the amount of energy consumed to operate an information handling system may be reduced while accepting the likely increase in the rate of corrosion of components disposed in the chassis. However, because it was determined that the rate of corrosion does not indicate a premature failure of the component is likely to occur, the rate of corrosion may be allowed to increase without negatively impacting the ability of the information handling system to meet its service life goal.

In one or more embodiments of the invention, the environmental control modification is a decrease in the amount of energy used to cool gases taken in by the chassis.

In one or more embodiments of the invention, the environmental control modification is a decrease in the amount of energy used to extract humidity from gases taken in by the chassis.

In one or more embodiments of the invention, the environmental control modification is a decrease in the amount of energy used to circulate gases through the chassis.

The method may proceed to step 410 following step 408. As discussed above, the method may end following step 410.

Using the method illustrated in FIG. 4.1, a system in accordance with embodiments of the invention may prevent premature failures due to corrosion of components of an information handling system while reducing the amount of energy required to manage the internal environments of chassis of the information handling system.

FIG. 4.2 shows a flowchart of a method in accordance with one or more embodiments of the invention. The method depicted in FIG. 4.2 may be used to obtain a rate of corrosion associated with a component in accordance with one or more embodiments of the invention. The method shown in FIG. 4.2 may be performed by, for example, an environmental manager (e.g., 200, FIG. 2). Other components of the system illustrated in FIGS. 1.1-1.5 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, a corrosion rate estimate is obtained using a corrosion detector. The corrosion rate estimate may be valid for components that are proximate to the corrosion detector. In one or more embodiments of the invention, the component is not proximate to the corrosion detector.

In step 422, a first temperature of an ambient environment proximate to the corrosion detector is obtained. The first temperature may be obtained using a temperature sensor disposed proximate to the corrosion detector.

In step 424, a second temperature of an ambient environment proximate to the component is obtained. Second temperature may be obtained using a second temperature sensor disposed proximate to the component. The second temperature sensor may be a discrete temperature sensor or may be integrated into the component.

In step 426, rate of corrosion of the component is estimated based on the corrosion rate estimate, the first temperature, and the second temperature. The differential between the first temperature and the second temperature may be used to identify a correction factor for the corrosion rate estimate. For example, these differences in temperatures may indicate that the component is increased more or less than that indicated by the corrosion rate estimate. The correction factor may be heuristically determined in the laboratory environment and provided to the environmental manager. For example, the table that provides correction factors based on the temperature differential may be stored in storage of the environmental manager.

The correction factor may be used to obtain an estimate of the rate of corrosion of the component. For example, the correction factor is multiplied by the rate of corrosion obtained using the corrosion detector to obtain the estimate of the rate of corrosion of the component.

The rate of corrosion may be calculated based on differential (e.g., the rates) and absolute amounts of corrosion (e.g., the total amount of corrosion that has occurred) determined using steps 420-426 at two different points in time. The difference between the absolute amounts of corrosion calculated at different points in time may be used to calculate the estimated rate of corrosion. For example, the rate of corrosion may be calculated by calculating the difference between the values of corrosion at two points in time. The aforementioned difference may then be divided by the difference in time between the two points in time to calculate the rate of corrosion.

The method may end following step 426.

Turning to FIG. 4.3, FIG. 4.3 shows a flowchart of a method in accordance with one or more embodiments of the invention. The method depicted in FIG. 4.3 may be used to identify an environmental control modification in accordance with one or more embodiments of the invention. The method shown in FIG. 4.3 may be performed by, for example, an environmental manager (e.g., 200, FIG. 2). Other components of the system illustrated in FIGS. 1.1-1.5 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 430, an airflow temperature increase that will reduce the corrosion rate to a level that prevents the premature failure is identified. For example, the rate of corrosion may be reduced by increasing the temperature of the ambient environment proximate to a component and/or the temperature of the component itself. The temperature increase may be calculated using the information included in the corrosion rate repository (210, FIG. 2) to determine a temperature that reduces the rate of corrosion to a level that will cause the component to be unlikely to fail prior to the service life of the component and/or device incorporating the component.

For example, the equation discussed with respect to step 404 may be used to determine the corrosion rate (e.g., set the corrosion rate so that the failure time coincides with the occurrence of the service life or the service life minus a factor of safety). The corrosion rate may then be used to determine, using the corrosion rate repository (210) the temperature required to meet that corrosion rate.

The airflow temperature increase may be implemented by decreasing the rate of flow of gases within a chassis. By doing so, heat generated by computing components in the chassis will be extracted at a lower rate thereby increasing the temperature of airflow within the chassis. By heating the airflow, it may be less likely that corrosion will occur thereby reducing the corrosion rate if the reduction in airflow is implemented.

In step 432, it is determined whether the airflow temperature increase will impact a second component. For example, by increasing the temperature of the gases inside the chassis, other components may be impacted that each have their own sets of nominal operating temperatures. The nominal operating temperatures may be compared to the likely temperature impact of implementing the airflow temperature increase identified in step 430. If any component is likely to exceed its nominal temperature range for operating while also being actively cooled by airflows, it may be determined that the second component will be impacted.

For example, if a decrease in airflow is implemented, the temperature in the chassis is likely to increase while also reducing the rate of thermal energy extracted from computing components in the chassis. Consequently, reducing the airflow rate in the chassis may reduce the rate of corrosion but may cause the temperatures of computing components to increase beyond their nominal range. Accordingly, increasing the nominal temperature of the computing component may impact the computing component by prevent them from performing their functionality.

If the airflow temperature increase is determined as being likely to impact a second component, the method may proceed to step 436. If the airflow temperature increase is determined as being unlikely to impact a second component, the method may proceed to step 434.

In step 434, the temperature increase is scheduled for implementation. For example, a new operating point of one or more airflow control components may be determined based on the temperature increase. The change in airflow rate may be implemented in step 410 of FIG. 4.1.

The method may end following step 434.

Returning to step 432, the method may proceed to step 436 when it is determined that the airflow temperature increase will impact another component.

In step 436, a second environmental control modification that will reduce the impact on the second component is identified.

The second environmental control modification may include, for example, reducing the amount of humidity in gases taken into a chassis and/or heating gases taken into the chassis. Both of these changes may reduce the need to increase the airflow temperature. Consequently, the rate of airflow may be reduced by a smaller amount or may otherwise be reverted while still ensuring that the component does not prematurely fail.

Additionally, by enabling the airflow to be reverted, the airflow may mitigate the impact on the second component. For example, by maintaining the rate of airflow, thermal energy may continue to be efficiently extracted from the component thereby preventing it from being impacted by its generation of thermal energy.

In step 438, the second environmental control modification is scheduled for implementation. For example, a new operating point of one or more airflow conditioners and/or heaters may be set. The change in operating point may be implemented in step 410 of FIG. 4.1.

Consequently, when the second environmental control modification is implemented, it may revert a change in operating point of an air mover that controls airflow within the chassis while also heating and/or reducing the amount of humidity in the airflow within the chassis. Accordingly, both the risk of corrosion related failure and temperature related failure may be reduced.

The method may proceed to step 434 following step 438. As discussed above, the method may end following step 434.

Using the method illustrated in FIG. 4.3, a system may actively mitigate both corrosion related premature failure risk and temperature related risk by actively modifying multiple characteristics of the environment within the chassis of an information handling system.

To further clarify embodiments of the invention, a non-limiting example is provided in FIGS. 5.1-5.4. FIGS. 5.1-5.4 illustrate top view diagrams of a chassis (500) of an information handling system as its operation is changed over time in accordance with one or more embodiments of the invention. For the sake of brevity, only a limited number of components of the system of FIGS. 1.1-1.5 are illustrated in each of FIGS. 5.1-5.4.

Example

Consider a scenario as illustrated in FIG. 5.1 in which in which a chassis (500) of an information handling system houses computing components. The computing components may include, for example, a processor (502), memory modules (504), and a circuit card (506). The circuit card (506) may include corrosion sensitive traces (508) that may carry signals between the processor (502) and the memory modules (504). Specifically, the traces may be susceptible to corrosion when the relative level of humidity exceeds 55%. For example, the traces may be formed from copper that may form oxides or other compounds when exposed to gases that include a relative level of humidity that exceeds 55%.

To provide their functionalities, the processor (502) and the memory modules (504) may consume electricity and produce heat as a byproduct. Consequently, if left unchecked, the heat produced by these components may increase the temperatures of these components outside of their nominal operating ranges.

To manage the temperatures of these components, the chassis (500) may include fans (510). The fans (510) may have an adjustable rotation rate (512) that enables them to produce in airflow (516) of variable-rate. The operation of the fans (510) may be controlled by an environmental manager (not shown).

The airflow (516) may cause gases from an unconditioned air source (514) to flow into the chassis (500), passed by the computing components, and then exit the rear of the chassis as illustrated by the arrow having a dashed tail. However, because the gases are being obtained from an unconditioned air source (514), the absolute quantity of water vapor in the airflow (516) may vary as the ambient conditions change. For example, as humid air enters a region in which the chassis (500) is disposed, the amount of water vapor in the airflow (516) may increase.

Due to the presence of the water vapor in the airflow (516), the corrosion sensitive traces (508) may corrode at different rates depending on the quantity of water vapor in the airflow (516). Consequently, if the quantity of water vapor in the airflow (516) in conjunction with the temperature of the airflow (516) causes the relative level of humidity proximate to the corrosion sensitive traces (508) to exceed 55%, then the corrosion sensitive traces (508) may begin to corrode at a rate that is likely to cause the traces to fail prior to the occurrence of the end of the service life of the computing components disposed in chassis (500).

To mitigate this potential risk, the environmental manager may utilize a corrosion detector (520) to monitor the likelihood for the occurrence of corrosion.

For example, consider that a first point in time the temperature in the chassis (500) is 70° F. and the relative humidity level is determined to be 30%. In this example, the corrosion detector may report to the environmental manager that little corrosion is occurring. Consequently, the environmental manager may not take any action with respect to the risk of corrosion of the corrosion sensitive traces (508).

Now consider that a second point in time during which a storm front goes into the area which greatly increases the amount of humidity in the unconditioned air source (514). At the second point in time, the increase in the amount of humidity because the relative level of humidity the increase to 70% inside the chassis (500). At the second point in time, the corrosion detector (520) reports that large amounts of corrosion with respect to the corrosion sensitive traces (508) is occurring. Accordingly, the environmental manager takes action because of the high rate of corrosion of the corrosion sensitive traces (508).

Turning to FIG. 5.2, to address the risk presented by the high rate of corrosion, the environmental manager instructs the fans to decrease their rotation rates to a decreased rotation rate. Consequently, the airflow (516) has a decreased rate. The decreased rate of the airflow (516) causes the temperature of the environment proximate to the corrosion sensitive traces (508) to increase.

As the temperature of the ambient environment proximate to the corrosion sensitive traces (508) increases, the relative level of humidity in the ambient environment proximate to the corrosion sensitive traces (508) decreases to 40% by virtue of the increase in temperature even though the absolute quantity of water vapor in the environment proximate to the corrosion sensitive traces (508) remained the same. Consequently, the corrosion detector reports to the environmental manager that the rate of corrosion of the corrosion sensitive traces (508) greatly decreased. Accordingly, the environmental manager determines that the risk of premature failure of the corrosion sensitive traces has been mitigated.

Now consider, that at a third point in time illustrated in FIG. 5.3, the amount of power consumption by the processor (502) increases due to higher workloads hosted by the processor (502). Because of the decreased rate of airflow (516), the temperature of the processor (502) begins to increase to a level outside its nominal operating temperature range.

Based on the increase in temperature of the processor (502), the environmental manager determines that the processor (502) will fail if its increase in temperature is left unchecked. However, due to the increased quantity of water vapor in the ambient environment, the environmental manager is unable to simply increase the rotation rate (512) of the fans to address the increased temperature of the processor (502) because it would cause an unacceptable rate of corrosion of the corrosion sensitive traces (508).

To address the increased temperature of the processor, the environmental manager, as illustrated in FIG. 5.4, implements three changes: (i) increased rotation rate of the fans, (ii) conditioned the air source (514) to reduce the amount of humidity in the intake gases, and (iii) heating of the gases prior to intake.

By increasing the rotation rate of the fans, the temperature of the processor is returned to nominal. By heating the air source, the temperature of the gases used to generate the airflow is increased. Consequently, the warmer gases of the airflow, albeit at a greater flow rate, do not result in a change in the temperature of ambient environment proximate to the corrosion sensitive traces. Accordingly, the corrosion detector (520) reports that the rate of corrosion of has been maintained.

Lastly, the amount of humidity in the air source (514) is reduced thereby enabling the environmental manager to further increase the rotation rate, if necessary in the future, without negatively impacting the corrosion rate of the corrosion sensitive traces (508).

End of Example

Any of the components of FIGS. 1.1-1.5 may be implemented as distributed computing devices. As used herein, a distributed computing device refers to functionality provided by a logical device that utilizes the computing resources of one or more separate and/or distinct computing devices.

Figure 6:
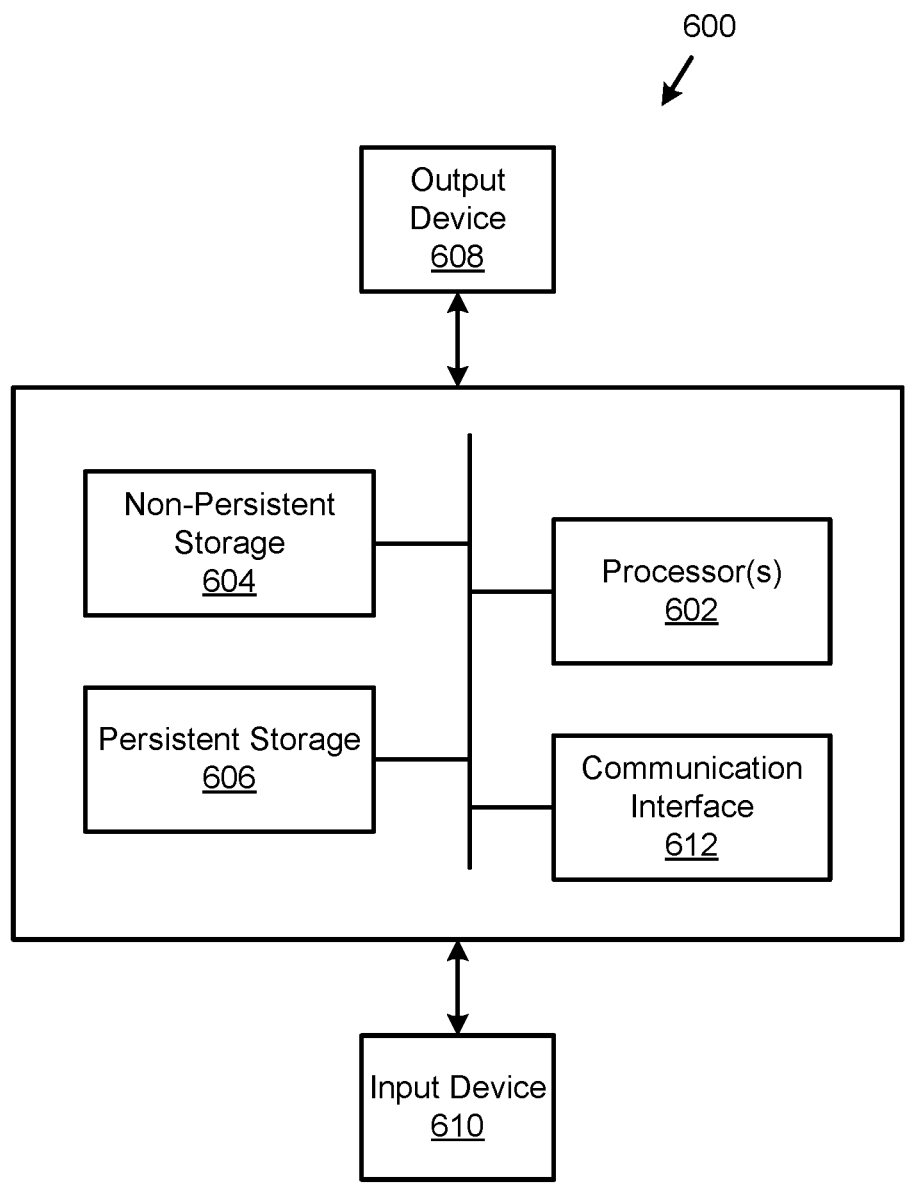
FIG. 6 shows a diagram of a computing device in accordance with one or more embodiments of the invention.

Additionally, as discussed above, embodiments of the invention may be implemented using a computing device. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide an improved method for managing components of an information handling system. Specifically, embodiments of the invention may provide a method and device for managing an environment in which components of an IHS may reside. To do so, embodiments of the invention may manage the environment based on the risk of corrosion and temperature sensitivities. By doing so, premature failures due to corrosion and temperature may be reduced. To ascertain these risks, a corrosion detector may be used to measure that amount of corrosion currently and that has occurred in the past. These measurements may be used to predict whether the information handling system is likely to prematurely fail due to corrosion. Consequently, an IHS in accordance with embodiments of the invention may be more likely to meet its service life goals.

Thus, embodiments of the invention may address the problem of environments that may cause premature failures of devices due to corrosion. Specifically, embodiments of the invention may provide a method of managing both the temperature and humidity level of the environment in a manner that reduces premature failure risks.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device of an information handling system, comprising:
   an environmental control component; and
   an environmental manager programmed to:
      identify an aggregate amount of corrosion of a component of the information handling system;
      obtain a rate of corrosion associated with the component, wherein the rate of corrosion specifies at least one selected from a group consisting of a corrosion impact (CI) of water vapor on the component, a CI of a chemical substance on the component, a CI of a temperature change on the component, and a CI of a chemically reactive and humid gas on the component;
      make a determination that the rate of corrosion indicates that the component will suffer a premature failure;
      in response to the determination:
         identify an environmental control modification that will reduce a chemically reactive and humid gas flowrate within an internal environment of a chassis that houses the computing device to remediate the premature failure of the component; and
         update an operation of the environmental control component based on the environmental control modification.

2. The computing device of claim 1, wherein the environmental manager is further programmed to:
   identify a second aggregate amount of corrosion of a second component of the information handling system;
   obtain a second rate of corrosion associated with the second component;
   make a second determination that the rate of corrosion indicates that the component is unlikely to prematurely fail;
   in response to the second determination:
      identify a second environmental control modification that:
         reduces an energy consumption rate used for management of the internal environment, and
         increases the second rate of corrosion; and
         updates an operation of the environmental control component based on the second environmental control modification.

3. The computing device of claim 1, wherein the environment control modification comprises:
   increasing a temperature of the environment proximate to the component while a temperature of the component is above a nominal temperature range associated with the component.

4. The computing device of claim 3, wherein updating the operation of the environmental control component comprises reducing the flowrate within the environment proximate to the component generated by the environmental control component.

5. The computing device of claim 1, wherein obtaining the rate of corrosion associated with the component comprises:
   obtaining a corrosion rate estimate using a corrosion detector;
   obtaining a first temperature of an ambient environment proximate to the corrosion detector;
   obtaining a second temperature of an environment proximate to the component; and
   obtaining an estimate of the rate of corrosion of the component based on the corrosion rate estimate, the first temperature, and the second temperature.

6. The computing device of claim 1, wherein obtaining the rate of corrosion associated with the component comprises:
   obtaining a corrosion rate estimate for the component using a corrosion detector that is associated with the component.

7. The computing device of claim 1, wherein the environmental manager is further programmed to:
   after updating the operation of the environmental control component:
      make a second determination that a temperature of the component has exceeded a nominal range associated with the component;
      in response to the second determination:
         revert the operation of the environmental control component; and
         decrease a humidity level of a source of a flow of the gas proximate to the component.

8. A method for environmentally managing a computing device of an information handling system, comprising:
   identifying an aggregate amount of corrosion of a component of the information handling system;
   obtaining a rate of corrosion associated with the component, wherein the rate of corrosion specifies at least one selected from a group consisting of a corrosion impact (CI) of water vapor on the component, a CI of a chemical substance on the component, a CI of a temperature change on the component, and a CI of a chemically reactive and humid gas on the component;
   making a determination that the rate of corrosion indicates that the component will suffer a premature failure;
   in response to the determination:
      identifying an environmental control modification that will reduce a chemically reactive and humid gas flowrate within an internal environment of a chassis that houses the computing device to remediate the premature failure of the component; and
      updating an operation of an environmental control component of the computing device based on the environmental control modification.

9. The method of claim 8, further comprising:
   identifying a second aggregate amount of corrosion of a second component of the information handling system;
   obtaining a second rate of corrosion associated with the second component;
   making a second determination that the rate of corrosion indicates that the component is unlikely to prematurely fail;

in response to the second determination:
   identifying a second environmental control modification that:
      reduces an energy consumption rate used for management of the internal environment, and
      increases the second rate of corrosion; and
   updating an operation of the environmental control component based on the second environmental control modification.

10. The method of claim 8, wherein the environment control modification comprises:
   increasing a temperature of the environment proximate to the component while a temperature of the component is above a nominal temperature range associated with the component.

11. The method of claim 10, wherein updating the operation of the environmental control component comprises reducing the flowrate within the environment proximate to the component generated by the environmental control component.

12. The method of claim 8, wherein obtaining the rate of corrosion associated with the component comprises:
   obtaining a corrosion rate estimate using a corrosion detector;
   obtaining a first temperature of an ambient environment proximate to the corrosion detector;
   obtaining a second temperature of an environment proximate to the component; and
   obtaining an estimate of the rate of corrosion of the component based on the corrosion rate estimate, the first temperature, and the second temperature.

13. The method of claim 8, wherein obtaining the rate of corrosion associated with the component comprises:
   obtaining a corrosion rate estimate for the component using a corrosion detector that is disposed upstream from the component.

14. The method of claim 8, further comprising
   after updating the operation of the environmental control component:
      making a second determination that a temperature of the component has exceeded a nominal range associated with the component;
      in response to the second determination:
         reverting the operation of the environmental control component; and
         decreasing a humidity level of a source of a flow of the gas proximate to the component.

15. A non-transitory computer readable medium comprising computer readable program code, which when executed by a computer processor enables the computer processor to perform a method for environmentally managing a computing device of an information handling system, the method comprising:
   identifying an aggregate amount of corrosion of a component of the information handling system;
   obtaining a rate of corrosion associated with the component, wherein the rate of corrosion specifies at least one selected from a group consisting of a corrosion impact (CI) of water vapor on the component, a CI of a chemical substance on the component, a CI of a temperature change on the component, and a CI of a chemically reactive and humid gas on the component;
   making a determination that the rate of corrosion indicates that the component will suffer a premature failure;
   in response to the determination:
      identifying an environmental control modification that will reduce a chemically reactive and humid gas flowrate within an internal environment of a chassis that houses the computing device to remediate the premature failure of the component; and
      updating an operation of a environmental control component of the computing device based on the environmental control modification.

16. The non-transitory computer readable medium of claim 15, wherein the method further comprises:
   identifying a second aggregate amount of corrosion of a second component of the information handling system;
   obtaining a second rate of corrosion associated with the second component;
   making a second determination that the rate of corrosion indicates that the component is unlikely to prematurely fail;
   in response to the second determination:
      identifying a second environmental control modification that:
         reduces an energy consumption rate used for management of the internal environment, and
         increases the second rate of corrosion; and
      updating an operation of the environmental control component based on the second environmental control modification.

17. The non-transitory computer readable medium of claim 15, wherein the environment control modification comprises:
   increasing a temperature of the environment proximate to the component while a temperature of the component is above a nominal temperature range associated with the component.

18. The non-transitory computer readable medium of claim 17, wherein updating the operation of the environmental control component comprises reducing the flowrate within the environment proximate to the component generated by the environmental control component.

19. The non-transitory computer readable medium of claim 15, wherein obtaining the rate of corrosion associated with the component comprises:
   obtaining a corrosion rate estimate using a corrosion detector;
   obtaining a first temperature of an ambient environment proximate to the corrosion detector;
   obtaining a second temperature of an environment proximate to the component; and
   obtaining an estimate of the rate of corrosion of the component based on the corrosion rate estimate, the first temperature, and the second temperature.

20. The non-transitory computer readable medium of claim 15, wherein obtaining the rate of corrosion associated with the component comprises:
   obtaining a corrosion rate estimate for the component using a corrosion detector that is disposed upstream from the component.

* * * * *